US011897225B2

(12) United States Patent
Taillon et al.

(10) Patent No.: US 11,897,225 B2
(45) Date of Patent: Feb. 13, 2024

(54) APPARATUS AND METHOD FOR INSERTING THERMAL INSULATING BOX LINERS

(71) Applicant: Cascades Canada ULC, Kingsey Falls (CA)

(72) Inventors: Martin Taillon, St-Bruno (CA); Simon Provencher, St-Bruno (CA); Tommy Damphousse, Louiseville (CA); Dominic Ebacher, Louiseville (CA)

(73) Assignee: Cascades Canada ULC, Kingsey Falls (CA)

( * ) Notice: Subject to any disclaimer, the term of this patent is extended or adjusted under 35 U.S.C. 154(b) by 0 days.

(21) Appl. No.: 18/105,596

(22) Filed: Feb. 3, 2023

(65) Prior Publication Data

US 2023/0249427 A1 Aug. 10, 2023

Related U.S. Application Data

(60) Provisional application No. 63/267,554, filed on Feb. 4, 2022.

(51) Int. Cl.

| | |
|---|---|
| ***B31B 50/81*** | (2017.01) |
| ***B31B 50/78*** | (2017.01) |
| ***B31B 50/00*** | (2017.01) |
| ***B31B 50/07*** | (2017.01) |
| ***B31B 50/06*** | (2017.01) |
| *B31B 105/00* | (2017.01) |
| *B65D 81/38* | (2006.01) |
| *B31B 120/40* | (2017.01) |

(52) U.S. Cl.
CPC ............ *B31B 50/81* (2017.08); *B31B 50/005* (2017.08); *B31B 50/06* (2017.08); *B31B 50/07* (2017.08); *B31B 50/78* (2017.08); *B31B 2105/00* (2017.08); *B31B 2120/402* (2017.08); *B65D 81/3813* (2013.01)

(58) Field of Classification Search
CPC . B31B 50/00; B31B 2105/00; B31B 2100/00; B31B 50/005; B31B 50/07; B31B 2120/402
USPC ........................... 493/100, 89, 183, 128, 131
See application file for complete search history.

(56) References Cited

U.S. PATENT DOCUMENTS 4,581,005 A * 4/1986 Moen ...................... B31B 50/44
493/143
4,662,150 A * 5/1987 Johnson ................ B65B 43/265
53/458

(Continued)

*Primary Examiner* — Jacob A Smith
(74) *Attorney, Agent, or Firm* — Eversheds Sutherland (US) LLP

(57) ABSTRACT

Apparatus and methods for assembling thermally insulated containers are disclosed. In one example, an apparatus for inserting a first insulating liner panel and a second insulating liner panel into a rectangular box to form a thermally insulated container includes a first station with a flap opening assembly, a second station with a first liner panel insertion assembly for inserting a first liner panel within the box, and a third station with a second liner panel insertion assembly for inserting a second liner panel within the box. A box transfer system is configured to transfer the box between the first station, the second station, and the third station. A flap guide system maintains the at least two of the lid flaps of the box in the open configuration as the box is transferred from the first station to the third station.

20 Claims, 20 Drawing Sheets

(56) References Cited

U.S. PATENT DOCUMENTS

| | | | | |
|---|---|---|---|---|
| 5,224,919 | A * | 7/1993 | Walsh | B31B 50/00<br>493/110 |
| 2008/0067176 | A1 * | 3/2008 | Mansouri | B65D 77/061<br>220/676 |

* cited by examiner

APPARATUS AND METHOD FOR INSERTING THERMAL INSULATING BOX LINERS

TECHNICAL FIELD

The technical field generally relates to packaging, and more particularly to apparatus for use in assembling thermally insulated containers.

BACKGROUND

Containers, such as paperboard containers, have long been used to package and transport goods. Typical advantages of paperboard packaging include its relatively light weight, its relative strength and/or rigidity (particularly for e.g., corrugated cardboard packaging), and its ability to be assembled from box blanks. Paperboard may also be considered a relatively environmentally friendly packaging material. For example, it may be manufactured from post-consumer or otherwise recycled paperboard. Paperboard packaging material may itself be recyclable.

In some applications, it may be desirable to provide thermally insulated packaging. For example, thermally insulated packaging may be used when transporting perishable or otherwise temperature sensitive products, such as fresh foodstuffs.

An example of thermally insulated paperboard packaging includes northbox® paperboard containers, as available from Cascades Canada ULC of Kingsey Falls, Québec. In some examples, a northbox® may include a rectangular paperboard box that is internally lined with two insulating paperboard liner panels that collectively line each of the six interior faces of the box.

An example of northbox® packaging is illustrated in FIGS. 1 and 2. In FIG. 1, a first liner panel 10 is being introduced into a rectangular box 30. In FIG. 2, a second liner panel 20 is being introduced into the partially lined box 30. With the first and second liner panels in position, the flaps 35 of box 30 (for ease of illustration, only two of four flaps 35 of the box are shown in FIGS. 1 and 2) may be closed, providing a paperboard box with thermal insulation provided on each interior surface of the box. Specifically, in the illustrated example, a first end segment 11 of the first liner panel 10 is configured to be positioned adjacent a closed bottom end of the box 30, a second central segment 12 of the first liner panel 10 is configured to be positioned adjacent a sidewall of the box 30, and a third end segment 13 of the first liner panel 10 is configured to line the upper end of the box when the flaps 35 are closed. First, second, and third segments 21, 22, and 23 of the second liner panel 20 are each configured to be positioned adjacent a respective sidewall of the box 30. In this example, segments 11, 12, and 13 of liner panel 10 are separated by fold lines, and segments 21, 22, and 23 of liner panel 20 are separated by fold lines.

At present, such packaging is typically assembled by manually positioning the insulating liner panels within a box to form a thermally insulated container.

SUMMARY

The following introduction is provided to introduce the reader to the more detailed discussion to follow. The introduction is not intended to limit or define any claimed or as yet unclaimed invention. One or more inventions may reside in any combination or sub combination of the elements or process steps disclosed in any part of this document including its claims and figures.

A thermally insulated container that includes a box lined with two thermally insulating liner panels (e.g., the example illustrated in FIGS. 1 and 2) may have one of the more advantages. For example, thermally insulating liner panels may be provided in dimensions suitable for insertion into known sizes of boxes. Also, providing thermal insulation as separate liner panels from the box may reduce the cost and/or complexity of producing the thermally insulated container. Also, providing thermal insulation as separate liner panels may facilitate the breakdown and/or recycling of some or all of the insulated container.

While apparatus for forming boxes (e.g., by manipulating boxboard blanks into assembled boxes, with or without the addition of an adhesive), thermally insulated containers (e.g. the example illustrated in FIGS. 1 and 2) are typically assembled by manually positioning the insulating liner panels within a box.

Providing apparatus to automate some or all of a process for assembling thermally insulated containers may have one or more advantages. For example, such a machine may provide an increased rate of assembly, and/or reduce the amount of manual labour required.

The apparatus can be adjustable for use with different sized boxes and/or liner panels.

In accordance with one broad aspect, there is provided apparatus for inserting a first insulating liner panel and a second insulating liner panel into a rectangular box to form a thermally insulated container, the box having a closed end, four sidewalls, an interior volume, and at least two lid flaps, the apparatus comprising: a first station comprising a flap opening assembly for directing the at least two of the lid flaps of the box to an open configuration; a second station comprising a first liner panel insertion assembly for inserting the first liner panel within the box, wherein in an inserted configuration a first segment of the first liner panel is positioned adjacent the closed end of the box, and a second segment of the first liner panel is positioned adjacent a first of the four sidewalls of the box; a third station comprising a second liner panel insertion assembly for inserting the second liner panel within the box, wherein in an inserted configuration a first segment of the second liner panel is positioned adjacent a second of the four sidewalls of the box, a second segment of the second liner panel is positioned adjacent a third of the four sidewalls of the box, and a third segment of the second liner panel is positioned adjacent a fourth of the four sidewalls of the box; a box transfer system configured to transfer the box between the first station, the second station, and the third station; and a flap guide system for maintaining the at least two of the lid flaps of the box in the open configuration as the box is transferred from the first station to the third station.

In some embodiments, the second station further comprises a first liner panel magazine assembly configured to receive a stack of first liner panels and to selectively provide a lowest one of the first liner panels from the stack of first liner panels to the second station.

In some embodiments, the first liner panel magazine assembly comprises: a platform for supporting the stack of first liner panels; first and second magazine sidewalls separated by a sidewall distance to define a liner panel loading chamber therebetween, each one of the first and second magazine sidewalls having at least one roller-receiving slot defined therethrough; at least one first roller mounted to a first drive shaft positioned outside the first magazine sidewall and having a portion thereof aligned with a respective one of the at least one roller-receiving slot; at least one second roller mounted to a second drive shaft positioned outside the second magazine sidewall and having a portion thereof aligned with a respective one of the at least one roller-receiving slot; and at least one actuator configured to rotate the first and second drive shafts in opposite directions; wherein as the first and second drive shafts are rotated: a perimeter of each of the at least one first roller and the at least one second roller cyclically projects inwardly through the respective one of the at least one roller-receiving slot and into the liner panel loading chamber to frictionally engage, respectively, a first side edge and a second side edge of at least one first liner panel in the stack of first liner panels and urge the engaged at least one first liner panel upwardly.

In some embodiments, the first and second drive shafts are eccentric, and the at least one first roller and the at least one second roller are each generally circular.

In some embodiments, the at least one first roller and the at least one second roller are eccentric.

In some embodiments, the perimeter of the at least one first roller and the perimeter of the at least one second roller each comprise a rubberized outer surface.

In some embodiments, the second station comprises a panel engagement mechanism configured to selectively engage an end segment of the lowest first liner panel in the stack of first liner panels.

In some embodiments, the first liner panel magazine assembly further comprises: an advancement mechanism provided on an upper surface of the platform, the advancement mechanism comprising: a raised projection configured to be selectively reciprocated between a retracted configuration, in which the raised projection is positioned distal from an outer end of the stack of first liner panels, and an advanced configuration in which the raised projection has moved towards the box located at the second station, wherein as the raised projection moves towards the advanced configuration, the raised projection is configured to abut an outer edge of the lowest first liner panel in the stack of first liner panels, thereby displacing the lowest first liner panel towards the box.

In some embodiments, the at least one actuator configured to rotate the first and second drive shafts and the advancement mechanism are synchronized such that as the engaged at least one first liner panel is urged upwardly, the raised projection is moved towards the advanced configuration.

In some embodiments, the third station further comprises a second liner panel magazine assembly configured to receive a stack of second liner panels and to selectively provide a lowest second liner panel from the stack of second liner panels to the third station.

In some embodiments, the third station comprises a folding assembly configured to fold end segments of a second liner panel inwardly towards a central segment of the second liner panel prior to the insertion of the second liner panel within the box.

In some embodiments, the folding assembly comprises a frame and first and second folding projections extending outwardly from the frame towards a pickup position for the second liner panel, the first and second folding projections being spaced horizontally from each other.

In some embodiments, the third station comprises a panel engagement mechanism, the panel engagement mechanism comprising: a vacuum plate configured to selectively engage the central segment of the second liner panel at the pickup position; and at least one motion actuator configured to convey the vacuum plate from the pickup position to a position proximate the frame of the folding assembly; wherein as the panel engagement mechanism conveys the central segment of the second liner panel from the pickup position to the position proximate the frame of the panel folding assembly, the first folding projection directs a first end segment to fold towards the central segment to form an acute angle between the first end segment and the central segment, and the second folding projection directs a second end segment to fold towards the central segment to form an acute angle between the second end segment and the central segment.

In some embodiments, the third station comprises a packing ram configured to be lowered towards the box, wherein, as the packing ram is lowered, the packing ram is configured to abut an edge of at least one of the first, second, and third segments of the second liner panel to urge the second liner panel to an inserted configuration within the box.

In accordance with another broad aspect, there is provided a magazine assembly for selectively advancing a lowest liner panel from a stack of rectangular liner panels, each liner panel having a top surface, a bottom surface, a front edge, a rear edge, and first and second side edges, the assembly comprising: a platform for supporting the stack of liner panels; first and second magazine sidewalls extending generally vertically from the platform, each one of the first and second magazine sidewalls having at least one roller-receiving slot defined therethrough, wherein the first and second magazine sidewalls are generally parallel to each other, wherein inner surfaces of the first and second magazine sidewalls are separated by a sidewall distance to define a liner panel loading chamber therebetween, the sidewall distance being equal to or greater than a width of each liner panel; at least one first roller mounted to a first eccentric drive shaft positioned outside the first magazine sidewall and having a portion thereof aligned with a respective one of the at least one roller-receiving slot; at least one second roller mounted to a second eccentric drive shaft positioned outside the second magazine sidewall and having a portion thereof aligned with a respective one of the at least one roller-receiving slot; and at least one actuator configured to rotate the first and second drive shafts in opposite directions; wherein as the first and second drive shafts are rotated: a perimeter of each of the at least one first roller cyclically projects inwardly and upwardly through the respective one of the at least one roller-receiving slot and into the liner panel loading chamber to frictionally engage a first side edge of at least one liner panel in the stack of liner panels and urge the engaged at least one liner panel upwardly, and a perimeter of each of the at least one second roller cyclically projects inwardly and upwardly through the respective one of the at least one roller-receiving slot and into the liner panel loading chamber to frictionally engage a second side edge of the engaged at least one liner panel and urge the engaged at least one liner panel upwardly, such that a vertical force applied to the top surface of the lowest liner panel in the stack of liner panels by the weight of the other liner panels in the stack is cyclically reduced.

In accordance with another broad aspect, there is provided an assembly for inserting a liner panel into a box, the assembly comprising: a panel engagement mechanism configured to selectively engage an end segment of the liner panel and convey the engaged liner panel from a pickup position to an insertion position where the engaged end segment overlies an open end of the box; and a guide positioned underneath the panel engagement mechanism and extending from a first end positioned proximate the pick-up position to a second end positioned proximate the open end of the box, wherein an upper surface of the guide is configured to support at least one non-engaged segment of the engaged liner panel as the engaged liner panel is conveyed from the pickup position to the insertion position; wherein the first end of the guide is secured in a fixed position, and the second end is unsupported.

In some embodiments, the liner panel is a segmented liner panel with fold lines defined between adjacent segments, and wherein the guide is a curved-shape plate.

In accordance with another broad aspect, there is provided an assembly for conveying and folding a segmented liner panel for insertion into a box, the liner panel having fold lines defining a first end segment, a central segment, and a second end segment, the assembly comprising: a panel engagement mechanism comprising a panel prehension tool configured to selectively engage the central segment of the liner panel at a pickup position and at least one motion actuator configured to displace the panel prehension tool; and a panel folding mechanism comprising a frame and first and second folding projections extending outwardly from the frame towards the pickup position, the first and second folding projections being spaced horizontally from each other; wherein as the panel engagement mechanism conveys the central segment of the liner panel from the pickup position to a position proximate the frame of the panel folding mechanism and between the first and second folding projections, the first and the second folding projections, respectively, direct the first and the second end segments to fold towards the central segment.

In some embodiments, the panel prehension tool comprises a vacuum plate and the panel engagement mechanism further comprises a rotary actuator configured to rotate the vacuum plate from a horizontal orientation to a vertical orientation.

In some embodiments, the first and second folding projections define an acute angle with the frame to form an acute angle between the first end segment and the central segment In accordance with another broad aspect, there is provided a method for inserting a first insulating liner panel and a second insulating liner panel into a rectangular box to form a thermally insulated container, the box having a closed end, four sidewalls, an interior volume, and at least two lid flaps, the method comprising: providing the box to a first station of a panel insertion apparatus; at the first station, directing the at least two of the lid flaps of the box to an open configuration; transferring the box to a second station of the panel insertion apparatus; at the second station, inserting the first liner panel within the box, wherein in an inserted configuration a first segment of the first liner panel is positioned adjacent the closed end of the box, and a second segment of the first liner panel is positioned adjacent a first of the four sidewalls of the box; transferring the box to a third station of the panel insertion apparatus; and at the third station, inserting the second liner panel within the box, wherein in an inserted configuration a first segment of the second liner panel is positioned adjacent a second of the four sidewalls of the box, a second segment of the second liner panel is positioned adjacent a third of the four sidewalls of the box, and a third segment of the second liner panel is positioned adjacent a fourth of the four sidewalls of the box.

It will be appreciated by a person skilled in the art that an apparatus or method disclosed herein may embody any one or more of the features contained herein and that the features may be used in any particular combination or sub-combination.

BRIEF DESCRIPTION OF THE DRAWINGS

For a better understanding of the described embodiments and to show more clearly how they may be carried into effect, reference will now be made, by way of example, to the accompanying drawings in which.

The drawings included herewith are for illustrating various examples of apparatus and methods of the teaching of the present specification and are not intended to limit the scope of what is taught in any way.

DETAILED DESCRIPTION

Various apparatuses and methods are described below to provide example embodiments and implementations of the technology. The technology includes apparatuses and methods that facilitate the formation of a thermally insulated container from a box and two insulating liner panels.

While the apparatus and methods disclosed herein are described specifically in relation to the insertion of liner panels within a box in the shape of a rectangular or square cuboid (hereinafter rectangular box), it will be appreciated that the apparatus and methods may alternatively be used with other materials. For example, liner panels having similar mechanical properties (e.g., panels formed partially or completely from plastic or thermoplastic material) may be inserted into boxes using apparatus disclosed herein. In some examples, liner panels may be honeycomb paperboard panels lined with paperboard laminated with a reflective polymer film.

The apparatuses and methods described herein may be used to partially or fully automate the insertion of first and second insulating liner panels into a rectangular box, such as a paperboard box, in order to provide a thermally insulated container.

Figure 1:
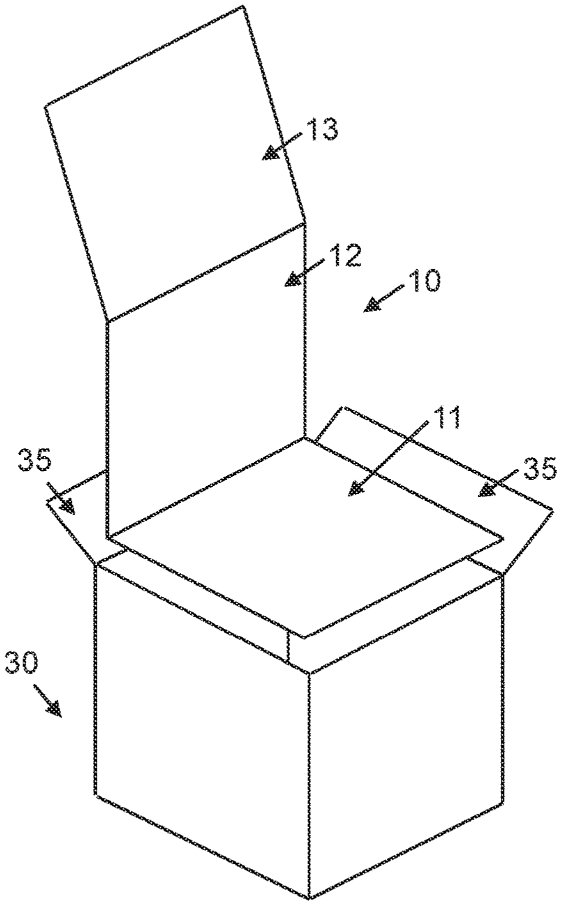
Figure 1 (PRIOR ART)
FIG. 1 is a schematic perspective view of a box and a first liner panel.
Figure 2:
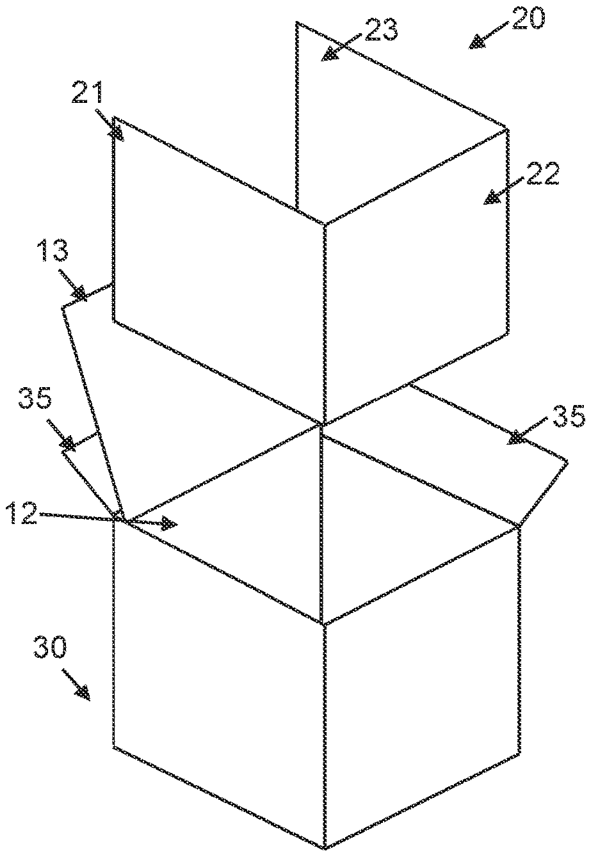
Figure 2 (PRIOR ART)
FIG. 2 is a schematic perspective view of the box of FIG. 1 with the first liner panel inserted therein and a second liner panel.
Figure 3:
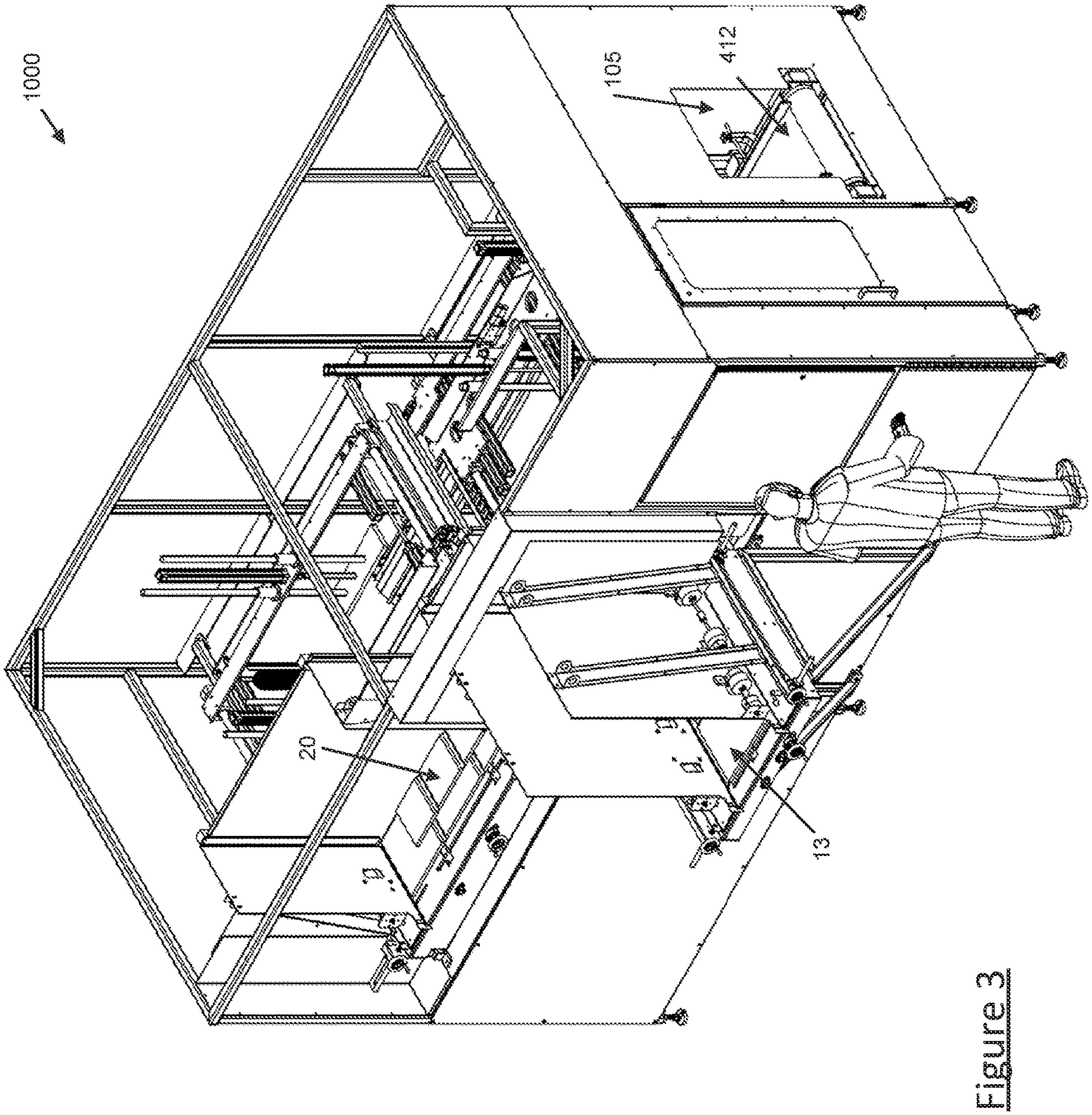
FIG. 3 is a perspective view of an apparatus for assembling thermally insulated containers.
Figure 4:
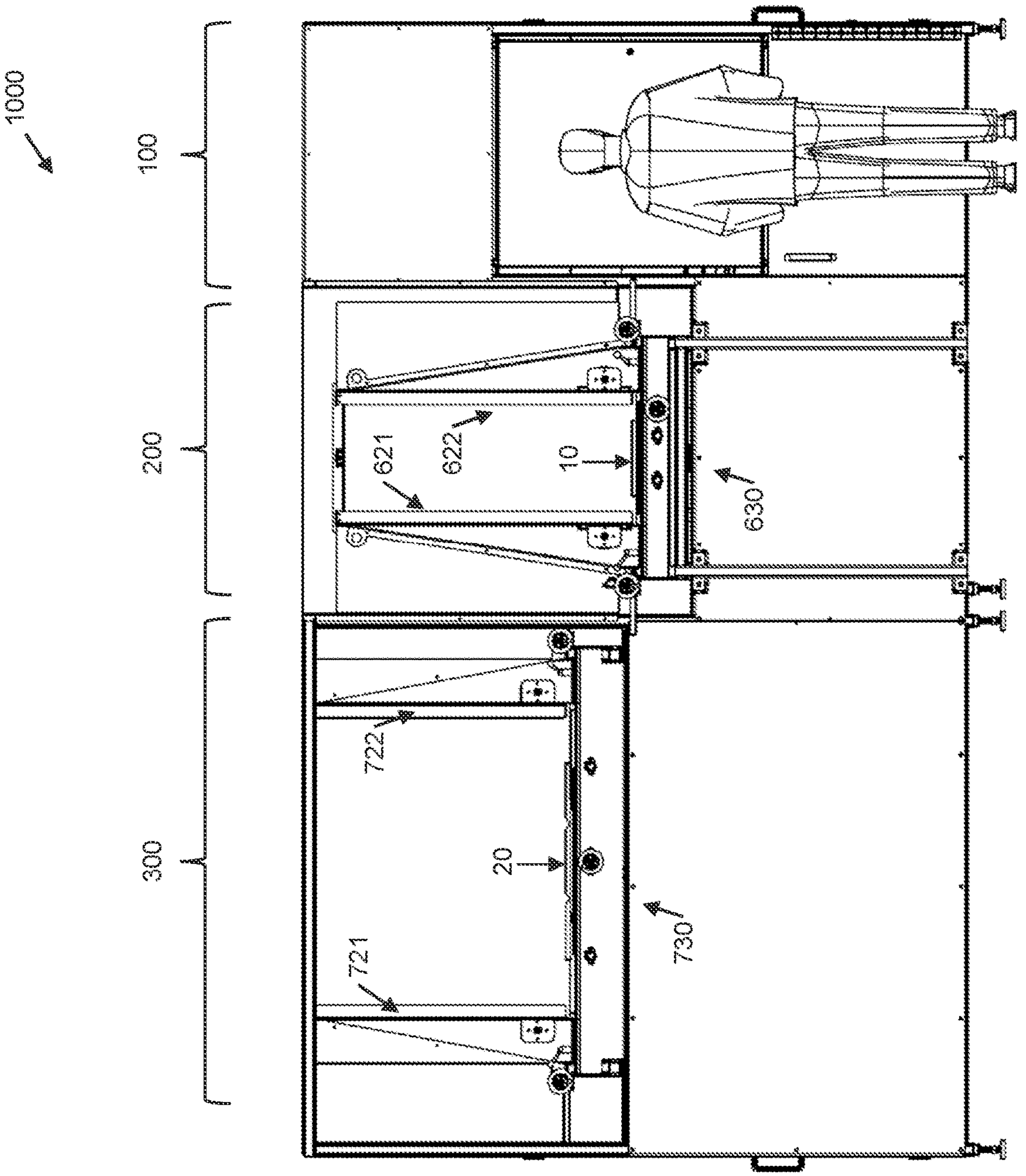
FIG. 4 is a front elevation view of the apparatus of FIG. 3.

FIGS. 3 to 20 illustrate an example apparatus for positioning thermal insulation liner panels within boxes, such as paperboard boxes, referred to generally as apparatus 1000. With reference to FIGS. 3 and 6, apparatus 1000 includes a first station 100 at which the top flaps of a box are opened, a second station 200 at which a first liner panel is inserted into the box, and a third station 300 at which a second liner panel is folded and inserted into the box along with the first liner panel.

In one or more embodiments, the first and the second liner panels are insulating liner panels. In one or more embodiments, the first and the second liner panels are segmented liner panels with fold lines defined between adjacent segments, e.g. between end segments and a central segment.

Figure 6:
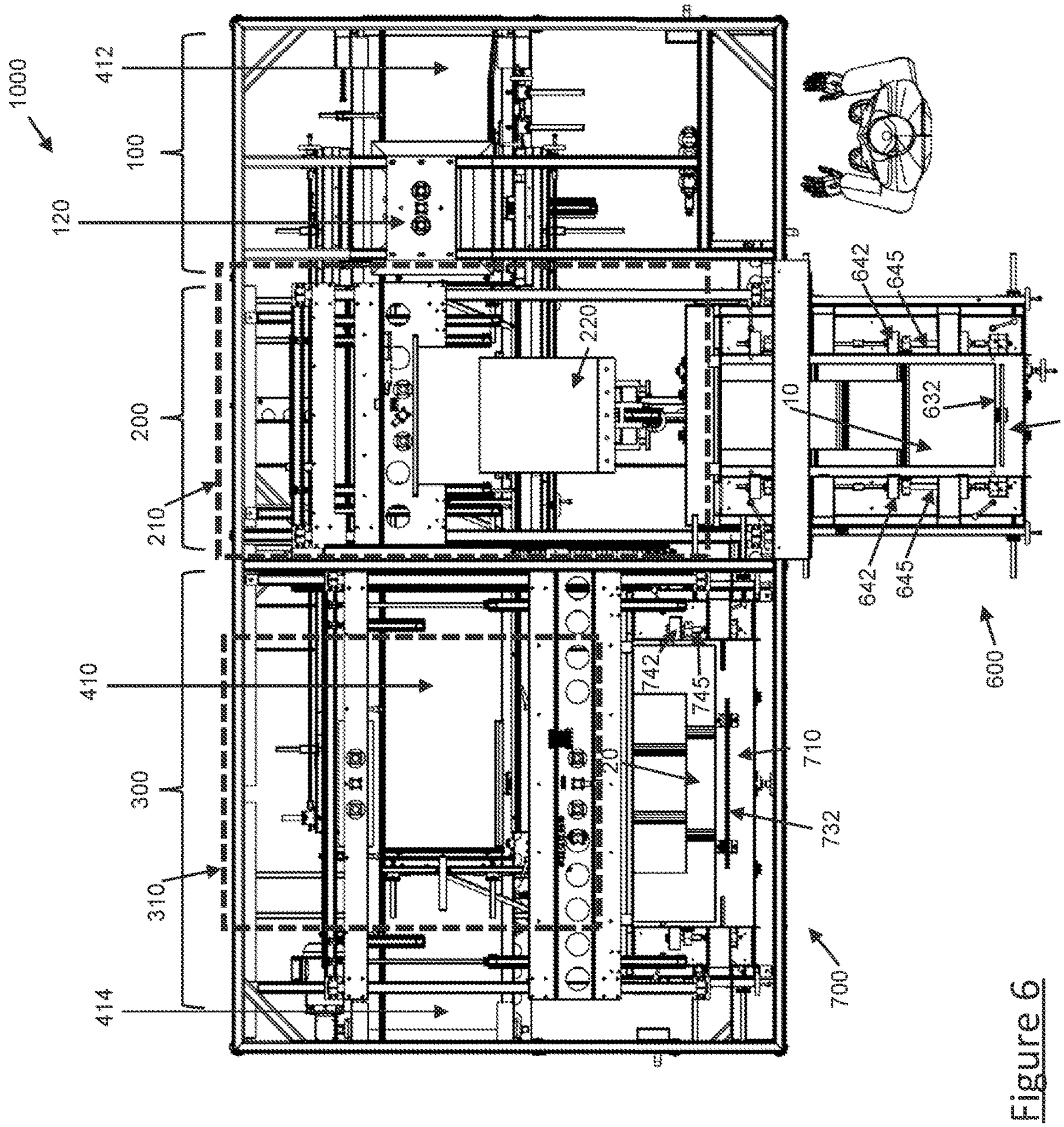
FIG. 6 is a top plan view of the apparatus of FIG. 3.
Figure 7:
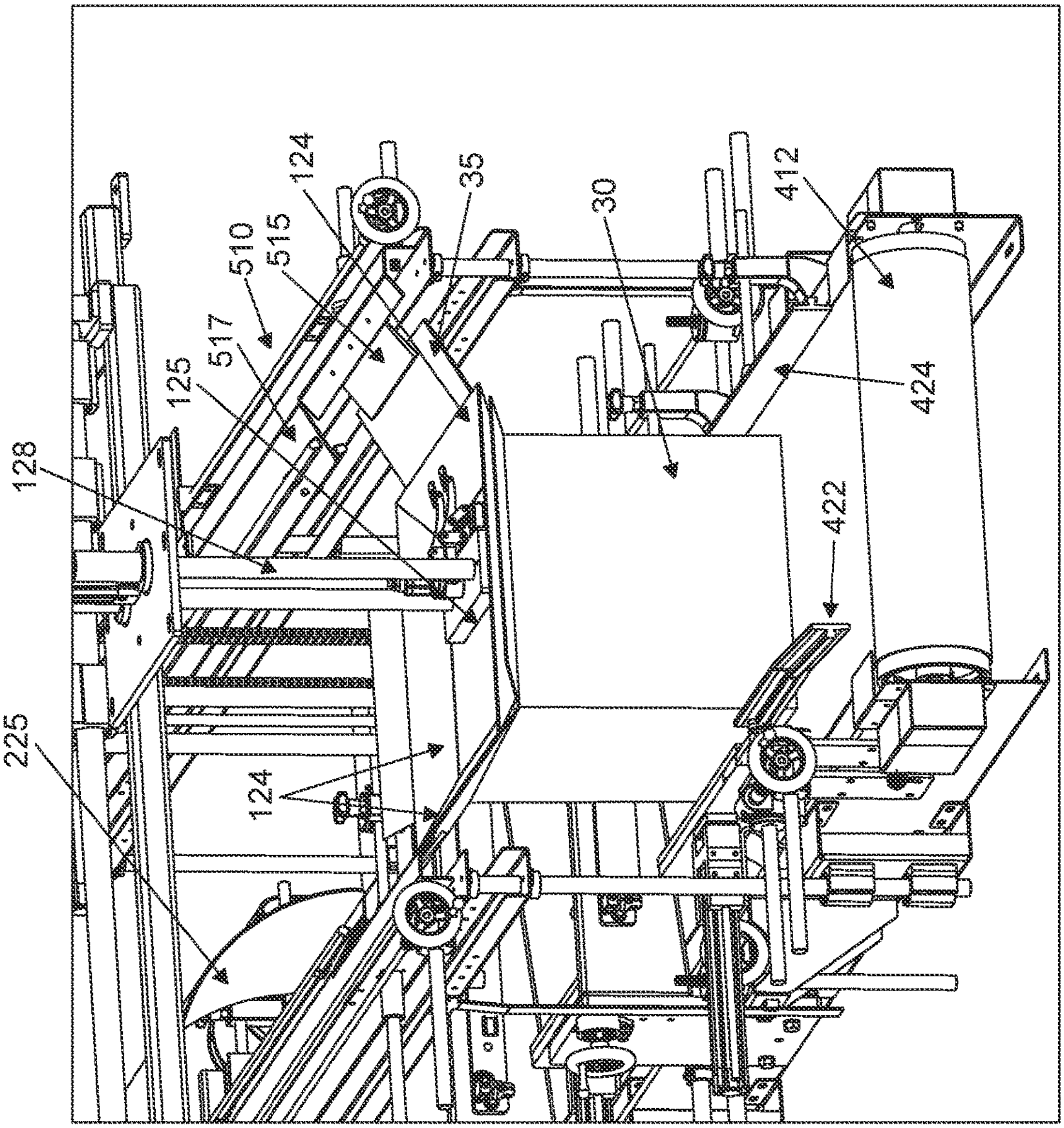
FIG. 7 is a perspective view of a first station of the apparatus of FIG. 3, with a flap opening assembly urging flaps of an upper end of a box towards an open configuration.

Apparatus 1000 also includes a box transfer system for advancing a box sequentially from the first station to the second station, and onto the third station. In the illustrated example, as shown in FIGS. 6 and 7, the box transfer system includes a conveyor system with a conveyor belt 410 having a first end 412 and a second end 414. The first, the second, and the third stations are located between the first end 412 and the second end 414. The example conveyor system also includes box guide rails 422 and 424 for laterally aligning a box 30 with respect to conveyor belt 410. In some embodiments, the position of at least one of guide rails 422 and 424 may be adjusted relative to conveyor belt 410, in order to adjust the lateral position of boxes advanced by the conveyor, and/or to accommodate boxes of differing widths.

Figure 5:
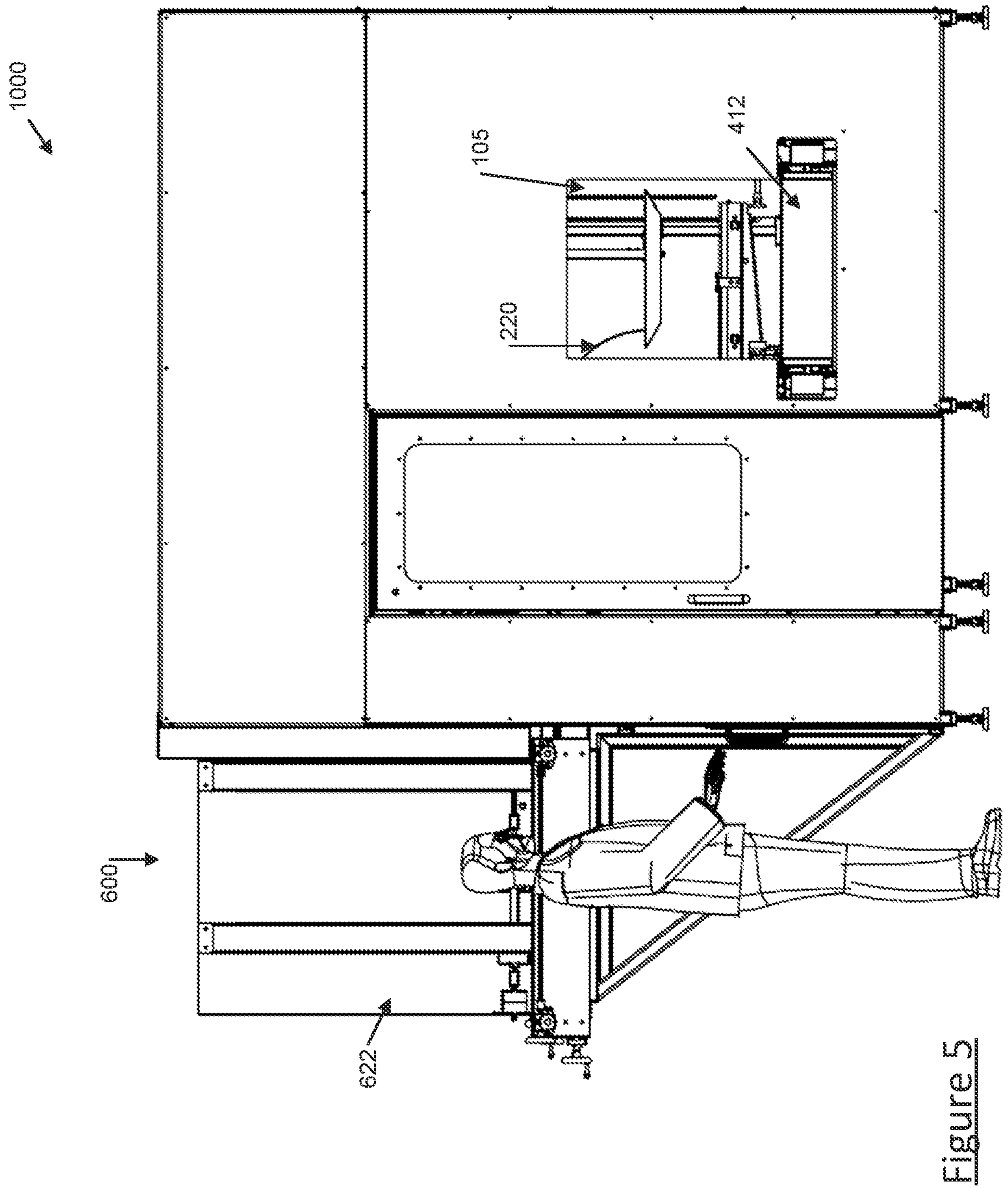
FIG. 5 is a side elevation view of the apparatus of FIG. 3.

With reference to FIGS. 3 and 5, in the illustrated example the first station 100 includes an optional entry port 105 for receiving empty boxes. In use, boxes may be placed on the first end 412 of conveyer belt 410 via entry port 105. For example, an output of a machine configured to pre-assemble cardboard boxes from boxboard blanks may be in communication with the entry port (e.g., via ramp, a conveyor, or the like). Alternatively, boxes may be fed manually into the entry port 105.

At first station 100, at least some of the top flaps 35 of a box 30 may be urged to an open configuration, i.e. extending outwardly of an open end of the box, in order to facilitate the subsequent insertion of liner panels.

With reference to FIGS. 6 and 7, in the illustrated example the first station 100 includes a flap opening assembly, referred to generally as 120. In use, after a box 30 has been positioned beneath the flap opening assembly 120, a flap opening wedge 125 may be lowered towards the open end of the box 30. In the illustrated example, flap opening assembly 120 includes a vertically-translatable frame 126, a linear actuator 128 operatively connected to the frame 126. The flap opening wedge 125 is mounted to the frame 126. Actuation of the linear actuator 128 selectively advances the flap opening wedge 125 towards conveyor 410 (and a box positioned thereon) and retracts the flap opening wedge 125 away from conveyor 410 once flaps 35 have been opened.

Figure 11:
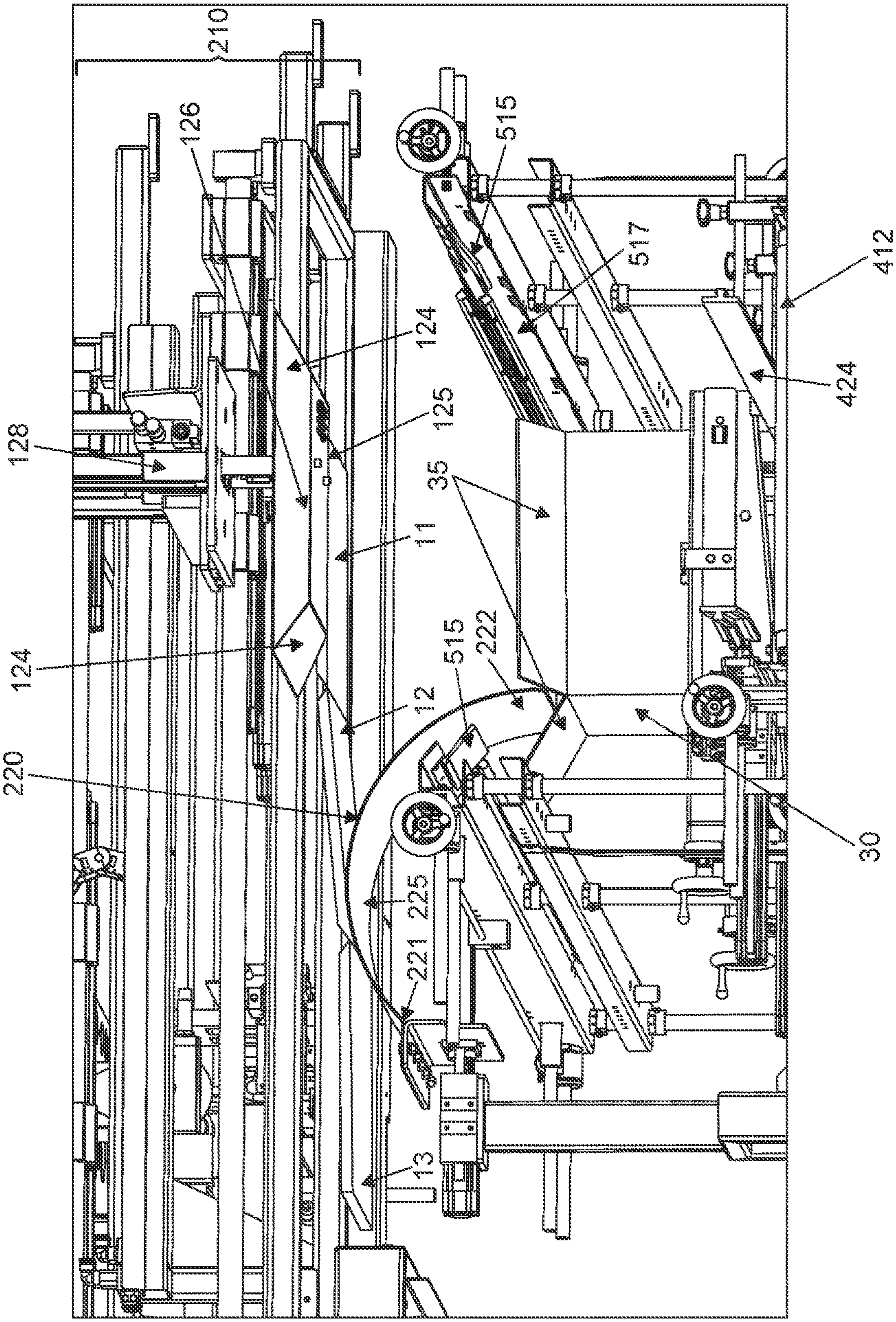
FIG. 11 is a perspective view of the second station of the apparatus of FIG. 3, with the vacuum plate of FIG. 10 and the engaged first liner panel positioned above an upper end of the box.

Turning to FIG. 11, in the illustrated example angled panels 124 are secured to a perimeter of frame 126 to form flap opening wedge 125. In turn, the frame 126 is mounted to a free end of the linear actuator 128. In use, as wedge 125 is lowered towards a box 30 positioned on the conveyor 410 under the wedge 125, the angled panels 124 engage the flaps 35 of box 30 and divert the flaps outwardly as the frame 126 and the angled panels 124 are lowered.

In the illustrated example and referring to FIGS. 7 and 11, apparatus 1000 also includes two spaced-apart flap guides 510 for retaining at least two flaps of a box 30 in an open configuration as the box 30 is transferred/advanced from the first station to subsequent stations. Each one of the flap guides 510 is positioned on a respective lateral side of the conveyor 410. In the illustrated example, each one of the flap guides 510 includes a resilient panel 515 positioned at the first station 100 such that when a flap 35 is depressed outwardly during the lowering of flap opening wedge 125, at least an outer portion of flap 35 may deflect resilient panel 515 until the flap 35 passes under panel 515, such that panel 515 acts to retain the flap 35 in an open configuration after flap opening wedge 125 has been retracted.

In the illustrated example, each one of the flap guides 510 also includes a rigid flange 517 positioned adjacent to the resilient panel 515. In the arrangement shown, as box 30 is transferred/advanced towards second station 200 after flap 35 has passed under panel 515, at least a leading edge of flap 35 will move to a position under flange 517. In this arrangement, flap 35 will be retained in an open configuration by 517 as the box is advanced away from the first station 100.

Figure 10:
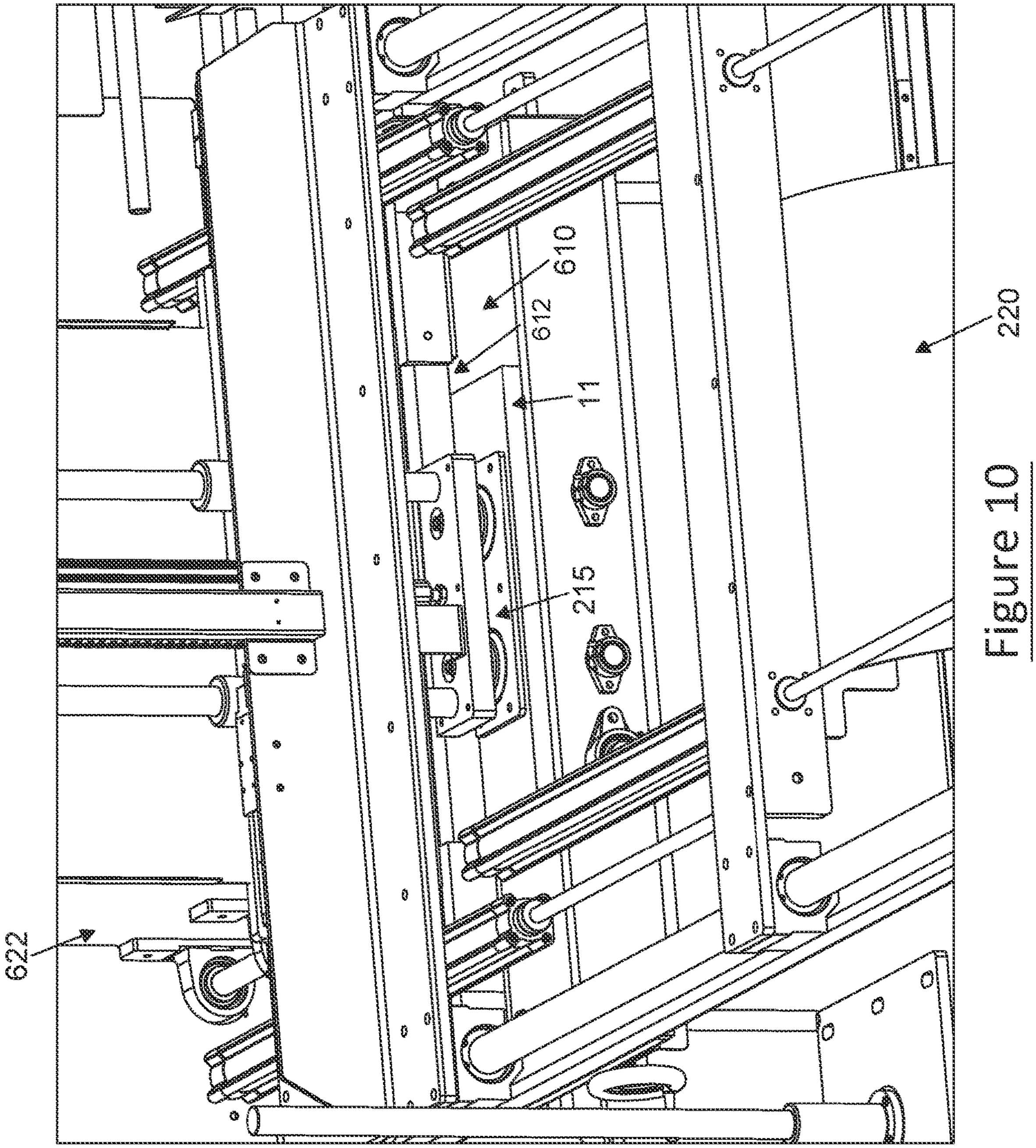
FIG. 10 is another perspective view of the outlet end of the first liner panel magazine assembly, with a vacuum plate of the second station in engagement with an end segment of a first liner panel.

Referring now to FIGS. 6, 10, and 11, the second station 200 is positioned adjacent first station 100, allowing a box 30 to be transferred/advanced from the first station 100 to the second station 200 by conveyor 410. Second station 200 includes a first liner insertion assembly for inserting a first liner panel 10 into a box 30 that has been advanced from the first station 100 with flaps 35 in an open configuration.

In the illustrated example, second station 200 includes a first liner engagement mechanism, referred to generally as 210. Engagement mechanism 210 is configured to releasably engage a first liner panel 10, move the engaged liner panel 10 to a position within a box 30, and disengage from first liner panel 10 once inserted within the box 30.

In the illustrated example, engagement mechanism 210 incudes a vacuum plate 215. It will be appreciated that pneumatic conduits and other components of the vacuum plate have been omitted for ease of illustration. For example, the vacuum plate 215 may include one or more suction cups to contact and form a seal with a liner panel 10.

Figure 8:
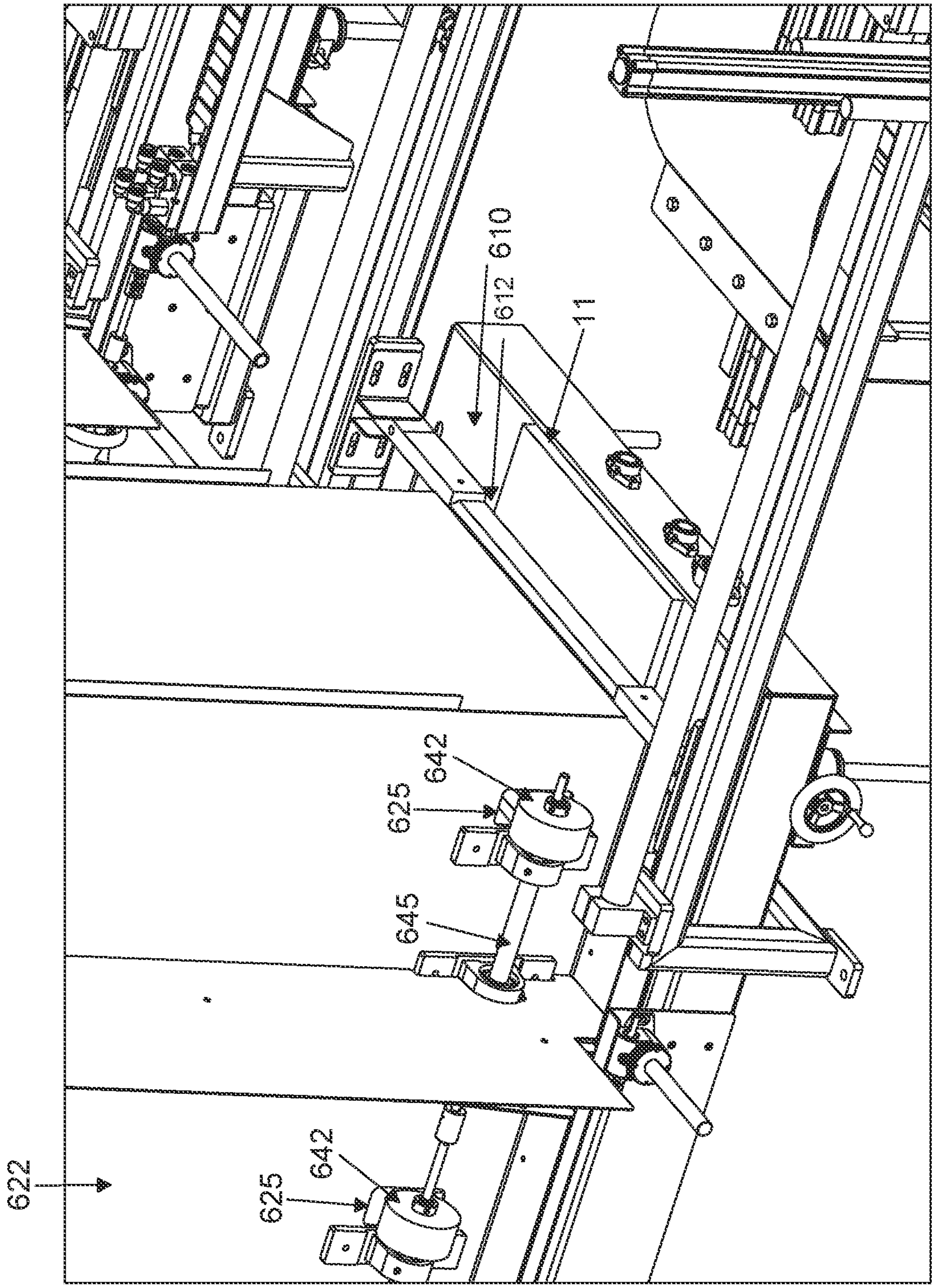
FIG. 8 is a perspective view of an outlet end of a first liner panel magazine assembly adjacent to a second station of the apparatus of FIG. 3.

The liner panel 10 is supplied by a first magazine assembly 600, which will be described in more detail below in reference to FIGS. 8 and 9. When supplying a liner panel 10 to the first liner engagement mechanism 210, the first magazine assembly 600 is configured to advance at least a portion of a first segment 11 of the first liner panel 10 towards conveyor 400, as shown in FIG. 8. For example, the liner panel 10 may be advanced/translated by about 6 inches. Once the liner portion has been advanced, engagement mechanism 210 is operable to engage first liner panel 10.

Then, the vacuum plate 215 of the first liner engagement mechanism 210 can seize the first liner panel via the advanced portion. Once vacuum plate 215 has secured itself to first segment 11 of first liner panel 10 (e.g., as shown in FIG. 10), vacuum plate 215—along with first segment 11 of first liner panel 10—may be moved to a position above the box 30 (e.g. as shown in FIG. 11) in the open configuration with its flaps 35 extending outwardly of the open end of the box 30.

Once vacuum plate 215—along with first segment 11 of first liner panel 10—has been moved to a position above the open box 30, vacuum plate 215 may be lowered towards the box 30, thereby positioning the engaged first liner panel 10 within the box 30. For example, vacuum plate 215 can be lowered until first segment 11 of the engaged liner panel 10 abuts the interior surface of the closed bottom end of the box 30.

In the illustrated example, the vacuum plate 215 is moved using linear actuators, which are depicted as electric ball-screw linear actuators. It will be appreciated that other suitable types of linear actuators, such as hydraulic or pneumatic actuators, made used in alternative embodiments.

Figure 12:
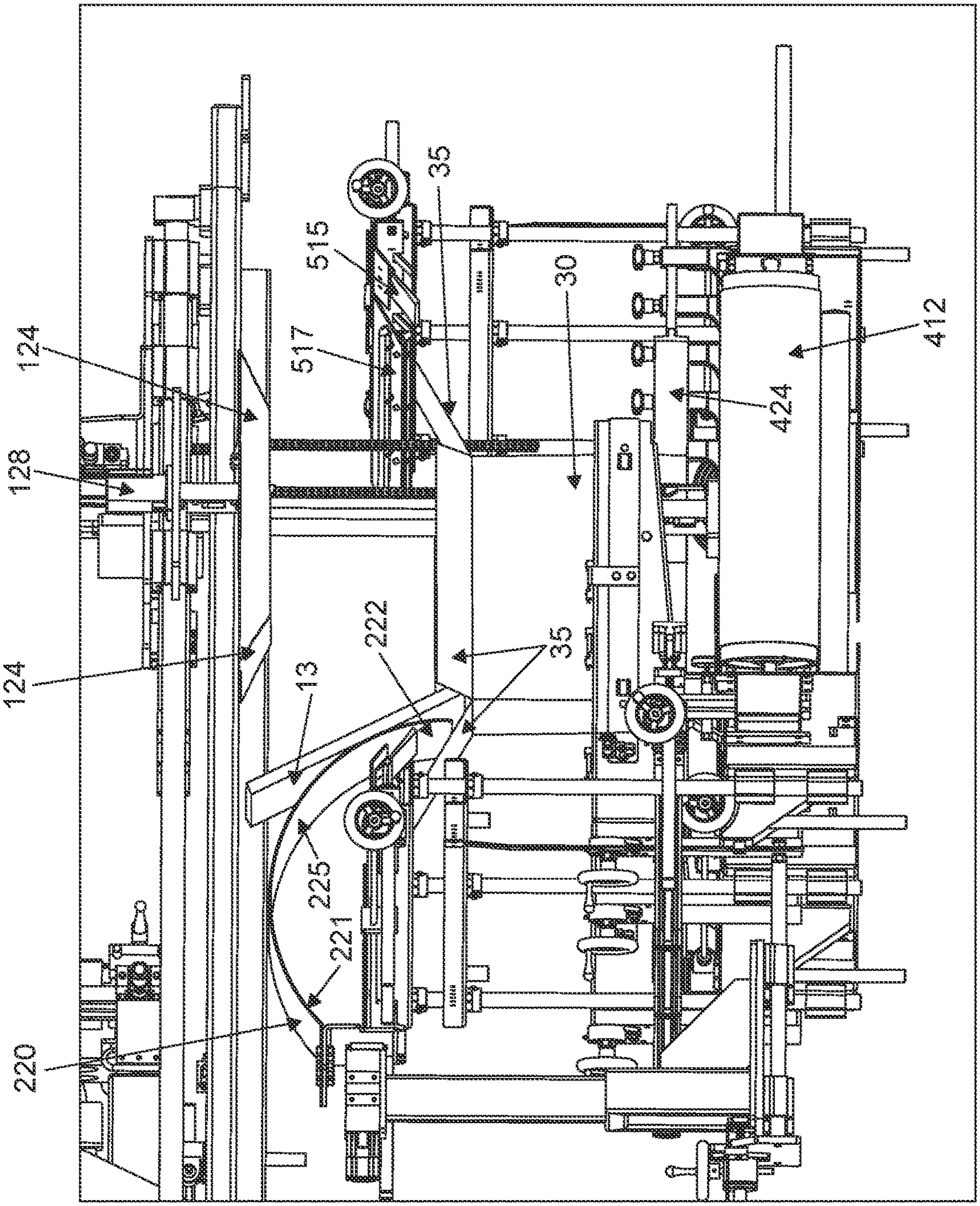
FIG. 12 is another perspective view of the second station of the apparatus of FIG. 3, with the vacuum plate of FIG. 10 and the engaged first liner panel positioned within the box.

As shown in FIGS. 11 and 12, the second station 200 also includes a deflection or guide surface 220 positioned below the path of vacuum plate 215. Providing such a guide surface 220 may have one or more advantages. For example, it may inhibit or prevent portions of a first liner panel 10 from interfering with otherwise exposed portions of apparatus 1000. Additionally, or alternatively, guide surface 220 may reduce stress on the first liner panel 10 (in particular the seams between adjacent panel segments 11, 12, 13), which may e.g., inhibit or prevent tearing during the transition to and/or insertion into box 30.

In the illustrated example, guide surface 220 is defined by an arcuate body 225 and, more particularly, a curved-shape plate, secured at a first end 221 to an apparatus frame, proximate the location where vacuum plate 215 engages first liner layer 10. A second end 222 of guide surface 220 is positioned such that will be proximate the open end of a box positioned at the second station 200.

In order to feed first liner panels 10 to second station 200, the first magazine assembly 600 may be provided. An example embodiment of magazine assembly 600 is shown in FIGS. 8 and 9. Magazine assembly 600 can be configured to receive a stack of first liner panels 10, and to selectively advance individual panels 10 from the stack of liner panels to an advanced position where they can be selectively grasped and drawn into a box 30 using engagement mechanism 210, e.g. as shown in FIGS. 8 and 10.

Figure 9:
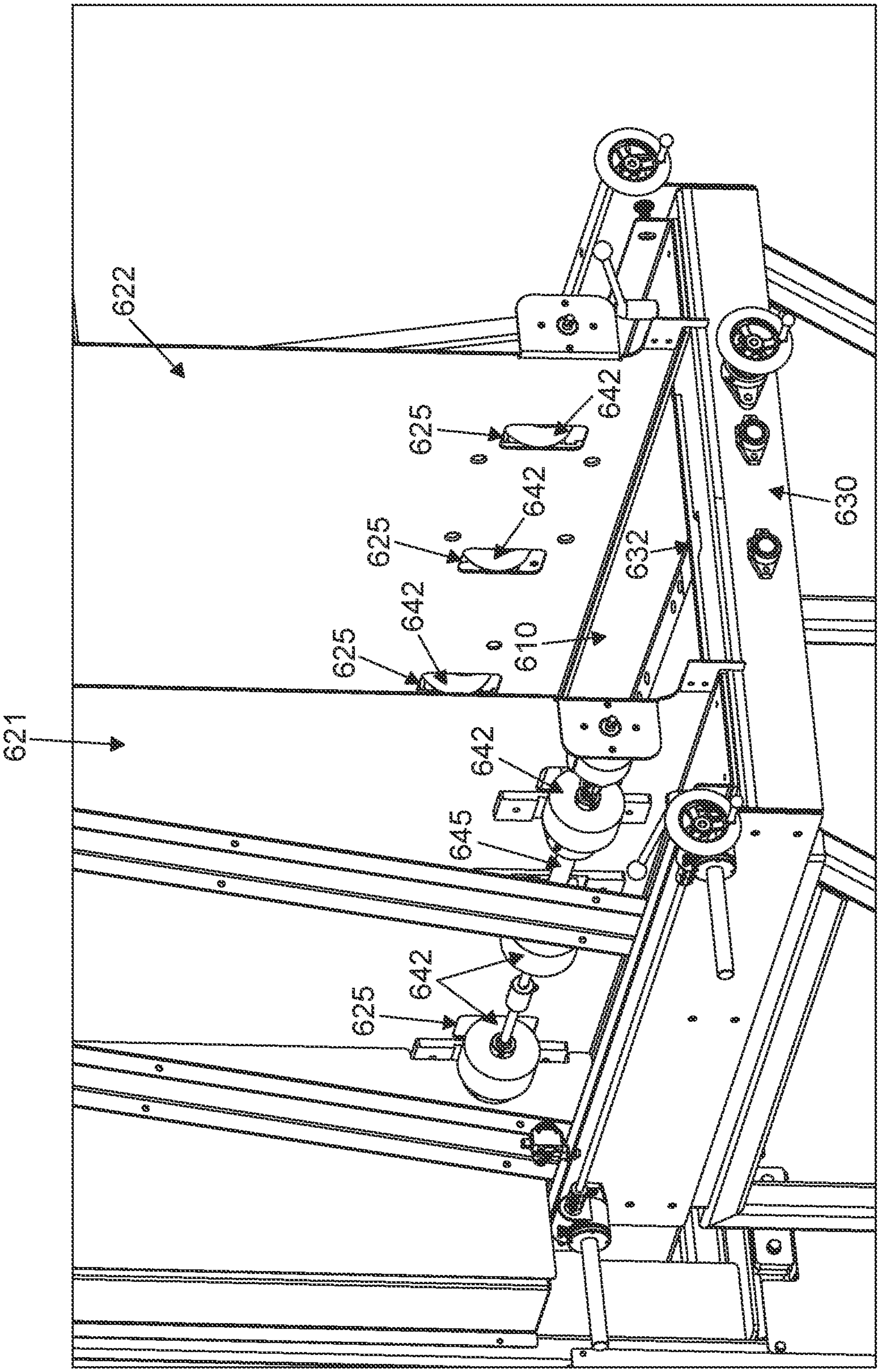
FIG. 9 is a perspective view of a loading end of the first liner panel magazine assembly.

Turning to FIG. 9, in the illustrated example the magazine assembly 600 includes a platform 610 for supporting a stack of first liner panels 10. Extending upwardly from platform 610 are first and second opposing magazine sidewalls 621, 622. An area of platform 610 between sidewalls 621, 622 may be characterized as a liner panel loading area while a volume between sidewalls 621, 622 may be characterized as a liner panel loading chamber. Each one of the sidewalls 621, 622 has slots 625 defined therein. Their purpose will be described below.

With reference to FIGS. 8 and 9, in the illustrated example the magazine assembly is configured to advance individual liner panels 10 from the bottom of a stack of liner panels (not shown). With reference to FIG. 9, an advancement mechanism 630 is provided on an upper surface of platform 610. The advancement mechanism includes a raised projection 632 that is configured to be selectively reciprocated between a retracted configuration, in which it is positioned distal from the outer end of a stack of liner layers, and an advanced configuration in which it has moved towards conveyor 410. As raised projection 632 moves to the advanced configuration, it will abut an outer edge of the lowest liner panel in the stack of liner panels, thereby urging the lowest liner panel through a slot 612 and towards engagement mechanism 210. Once the raised projection 632 has moved to the advanced configuration, at least a portion of a panel segment 11 of the lowest liner panel will be positioned for engagement by vacuum plate 215 (e.g., the position shown in FIGS. 8 and 10), as described above.

Returning to FIG. 9, in the illustrated example, the magazine assembly 600 also includes a liner panel stack de-weighting mechanism. The stack de-weighting mechanism is configured to temporarily support at least some of the weight of the stacked liner panels, and/or otherwise temporarily reduce the load applied to the lowest liner panel by other liner panels in the stack. During operation, the operation of the stack de-weighting mechanism and the advancement mechanism 630 are synchronized such that the raised projection 632 is moved towards the advanced configuration while the stack de-weighting mechanism is supporting (or otherwise reducing) thereby reducing a vertical load applied to the lowest liner panel, and consequently reducing friction on the lowest liner panel as it is advanced by the raised projection 632.

In the illustrated example, the stack de-weighting mechanism includes two sets of rollers 642 respectively positioned on each of the first and second sidewalls 621, 622 of the magazine assembly 600. In this example, the rollers in each set of rollers are mounted on an eccentric drive shaft 645 coupled to a pneumatic rotary actuator and extend through a respective one of the slots 625 defined in the sidewalls 621, 622 of the magazine assembly 600. As a result, when shaft 645 is rotated by the actuator, a distance that a perimeter of each roller 642 protrudes inwardly through slots 625 in sidewalls 621, 622 (i.e. within the liner panel loading chamber) varies over the course of a full rotation of the shaft 645. Alternatively, one or more eccentric rollers 642 may be mounted to a straight drive shaft 645, thereby achieving a similar effect. For example, rollers 642 can have a rubberized outer surface for enhanced friction with the panels 10 of a stack.

With continuing reference to FIG. 9, rotating the set of rollers 642 projecting through sidewall 621 in a counter clockwise direction, while concurrently rotating the set of rollers 642 projecting through sidewall 622 in a clockwise direction, results in an upward lifting action on a stack of liner layers positioned at or above the level of the rollers 642. More specifically, in this configuration, as the rollers 642 are rotated, the eccentricities of their drive shafts 645 result in a perimeter of the rollers 642 intermittently coming into abutment with and frictionally engaging the edges of the stack of liner layers. As the rollers 642 continue to rotate, the eccentricity will impart an inward and upward force (e.g., a lifting force) to at least a portion of the liner layers 10 in the stack. As a result, a downward load that would otherwise be applied on the lowest liner layer in the stack by the weight of the liner layers positioned above it in the stack may be at least temporarily reduced or offset.

The rollers 642, roller drive shafts 645, and the advancement mechanism 630 can be synchronized (either through mechanical means, electronic control means, or a combination thereof,) so that as the stack of liner layers is being lifted, the raised projection 632 is advancing the lowest liner panel in the stack layer towards engagement mechanism 210.

Returning to FIG. 6, third station 300 is positioned adjacent second station 200, allowing a box 30 (e.g., in which a first liner layer 10 has been installed) to be advanced from the second station 200 to the third station 300 by conveyor 410. Third station 300 includes a second liner insertion assembly for inserting a second liner panel 20 into a box 30 that has been transferred/advanced from the second station 200.

In order to feed second liner panels to third station 300, a second magazine assembly, referred to generally as 700, may be provided. Magazine assembly 700 can be configured to receive a stack of second liner panels 20, and to selectively advance individual panels 20 from the stack of liner panels to a position where they can be selectively grasped and drawn into a box 30 using a panel engagement mechanism 310 of third station 300.

In some aspects, some components of third station 300 and magazine assembly 700 are generally similar to components of second station 200 and magazine assembly 600. For brevity, such components are numbered in the same manner as components of second station 200 and magazine assembly 600, with the first digit of the reference number incremented by 1. For example, magazine assembly 700 includes a platform 710 that can be generally considered analogous to platform 610 of magazine assembly 600, and sidewalls 721, 722 that can be generally considered analogous to sidewalls 621, 622 of magazine assembly 600. Such components may not be otherwise discussed in detail.

In the illustrated example, third station 300 includes a second liner engagement mechanism, referred to generally as 310, that is configured to releasably engage a second liner panel 20, and move and rotate the engaged liner panel 20 to a position within box 30.

Figure 13:
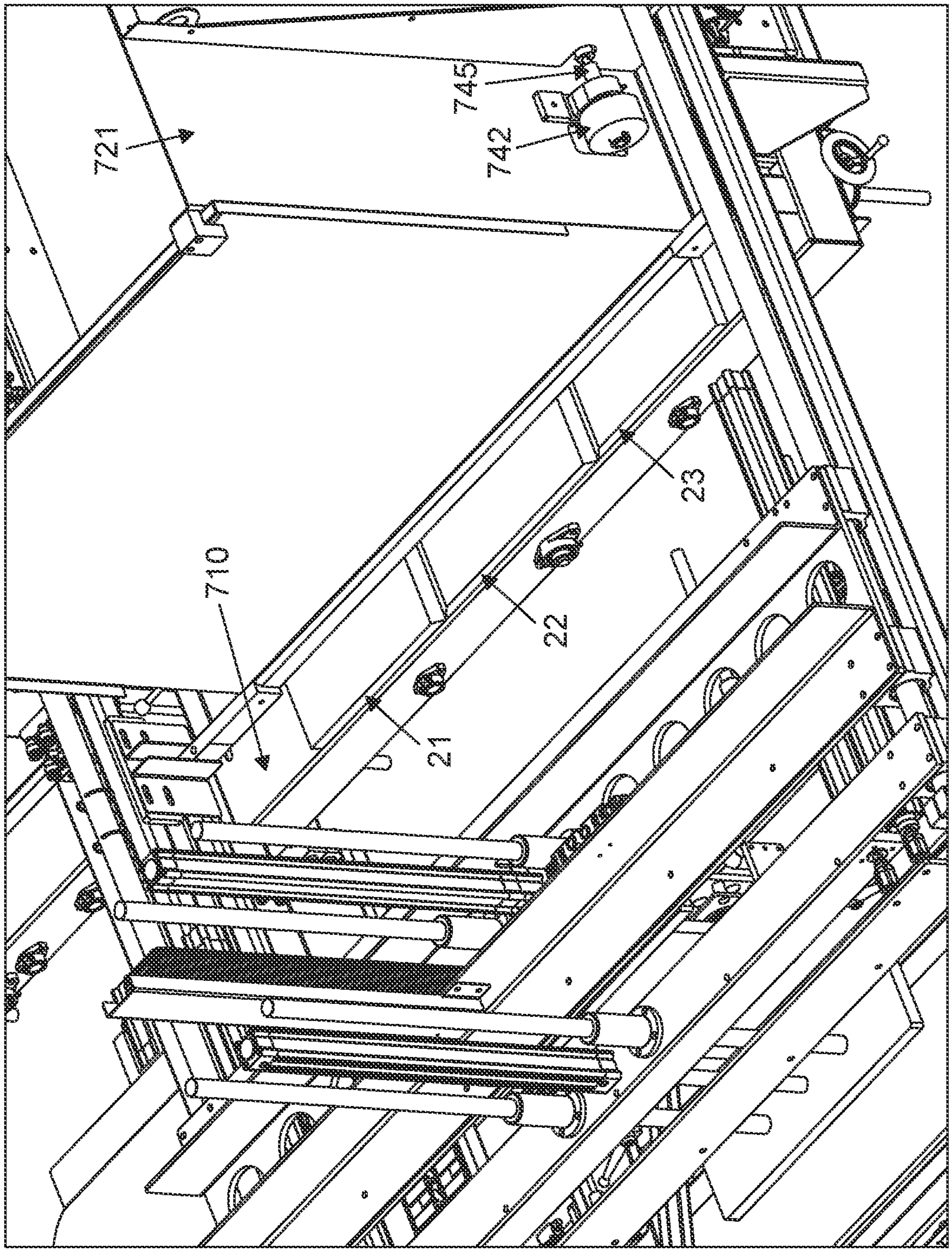
FIG. 13 is a perspective view of an outlet end of a second liner panel magazine assembly adjacent to a third station of the apparatus of FIG. 3.
Figure 14:
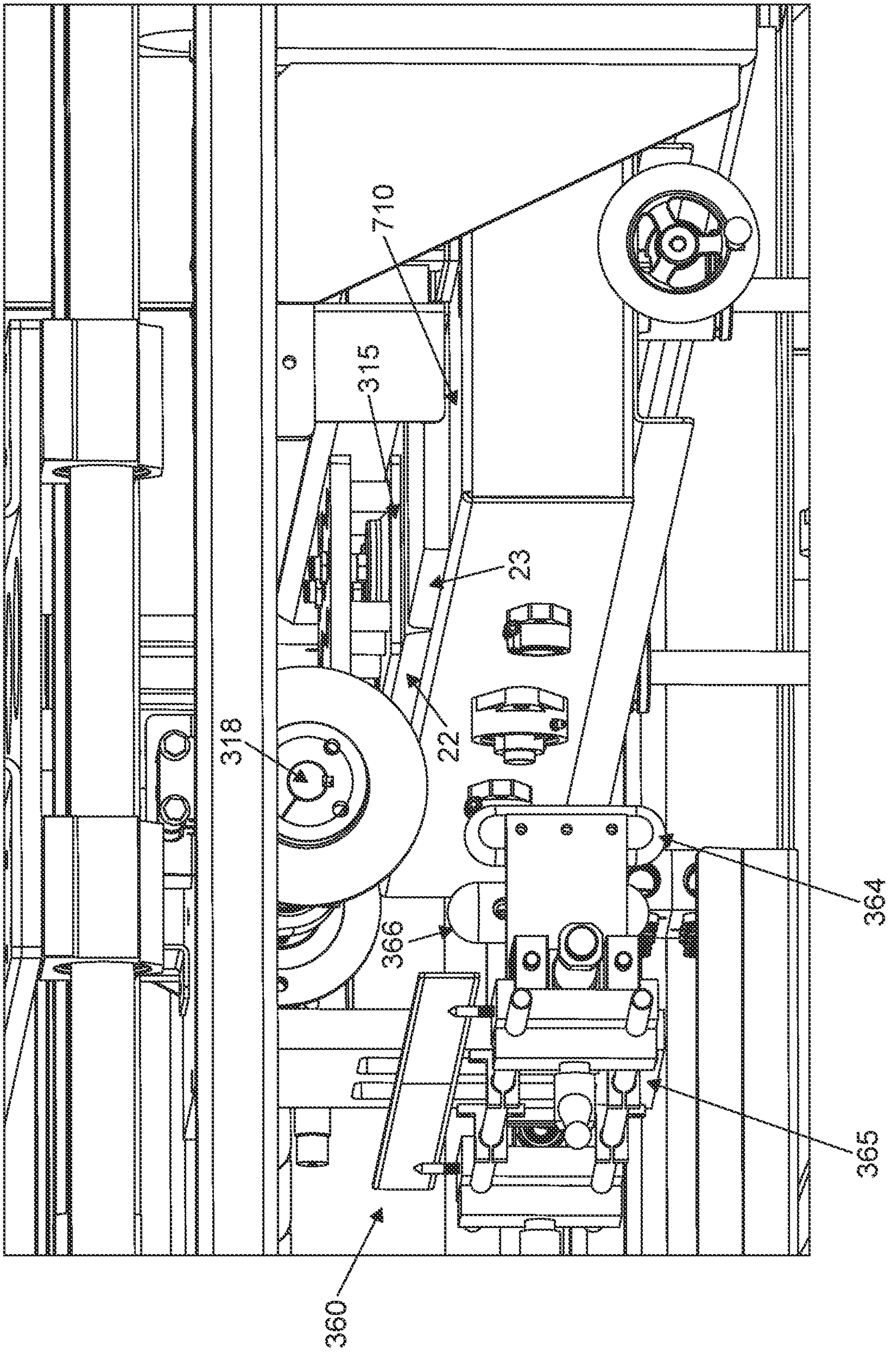
FIG. 14 is another perspective view of the outlet end of the second liner panel magazine assembly, with a vacuum plate of the third station in engagement with a central segment of a second liner panel.

Turning to FIGS. 13 and 14, at least a portion of a central segment 22 and end segments 21, 23 of a second liner panel 20 may be carried/advanced towards conveyor 400 by an advancement mechanism 730. For example, the liner panel 20 may be advanced by about 6 inches. Once the second liner panel has been advanced to a pickup position, engagement mechanism 310, including vacuum plate 315, is operable to engage central segment 22 of the second liner layer 20.

Figure 15:
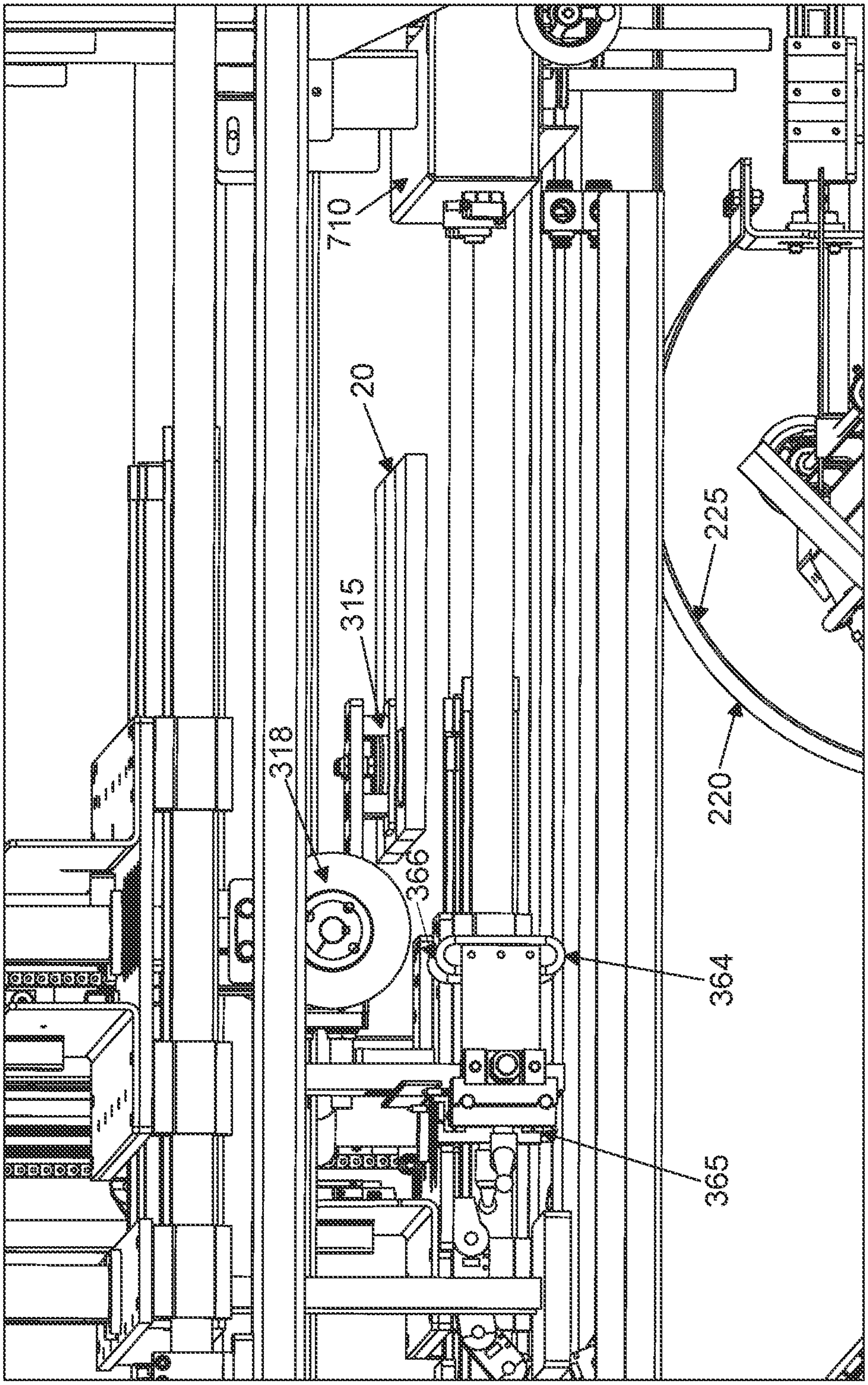
FIG. 15 is a perspective view of the third station of the apparatus of FIG. 3, with the vacuum plate of FIG. 14 and the engaged second liner panel moved clear of the second liner panel magazine assembly.

Once vacuum plate 315 has secured itself to the central segment 22 (e.g., as shown in FIG. 14), vacuum plate 315—along with second liner panel 20—may be moved to a position clear of platform 710 (e.g. as shown in FIG. 15).

Figure 16:
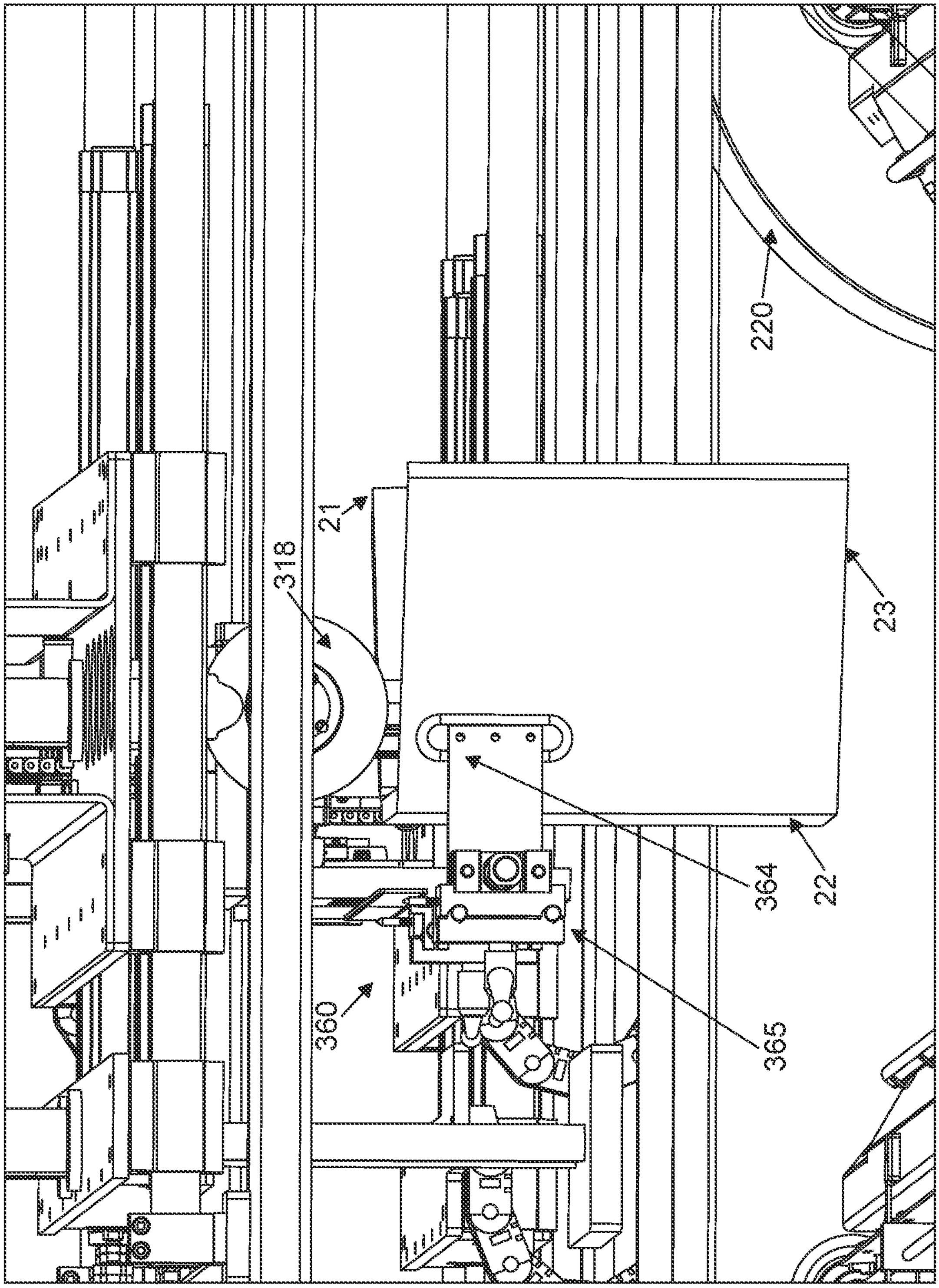
FIG. 16 is another perspective view of the third station of the apparatus of FIG. 3, following a rotation of the vacuum plate of FIG. 14 and the engaged second liner panel, and following folding of the second liner panel by a folding assembly.
Figure 17:
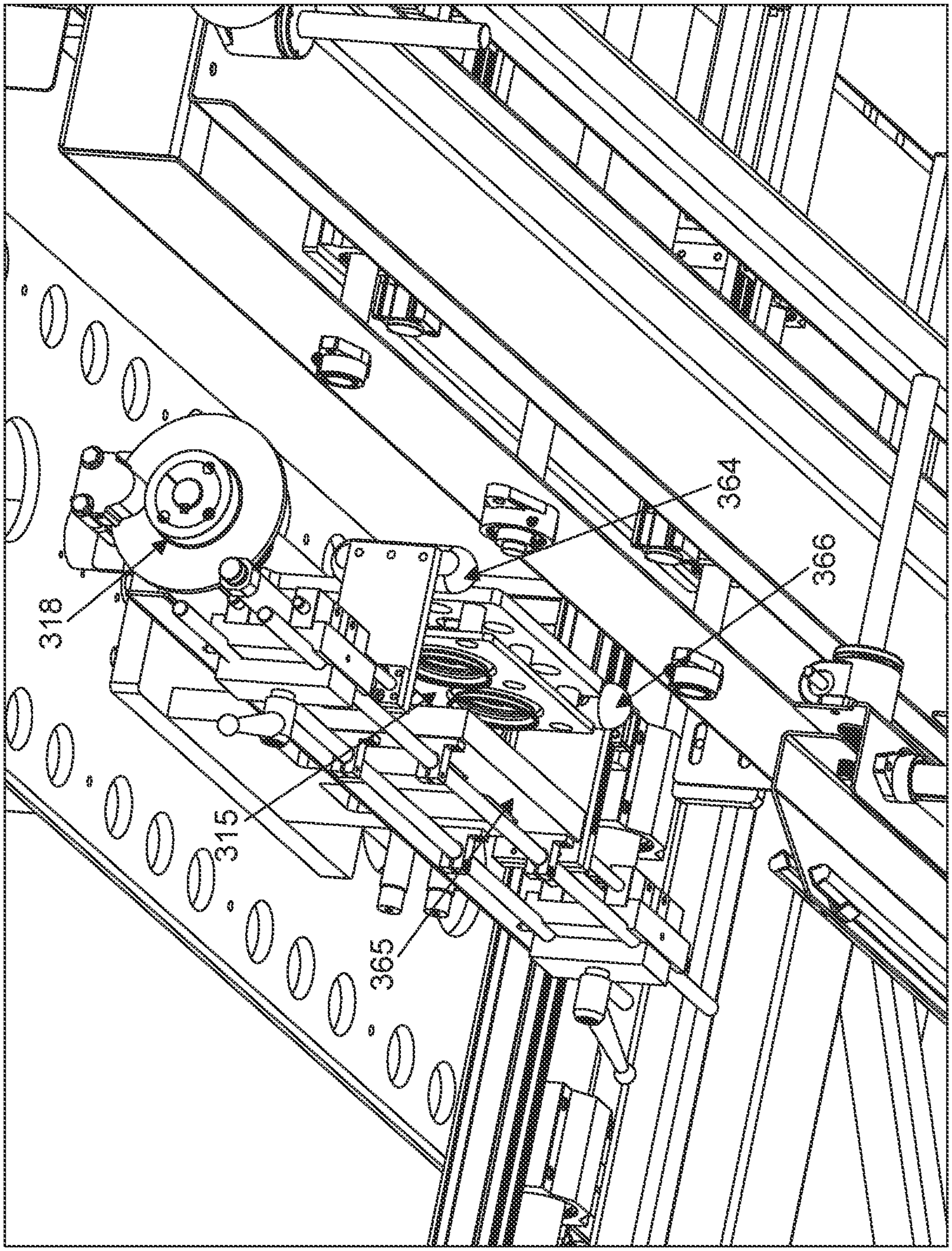
FIG. 17 is a perspective view of the vacuum plate and the folding assembly of the third station of the apparatus of FIG. 3.

With reference to FIGS. 15 and 16, once vacuum plate 315 has moved second liner panel 20 clear of platform 710, a rotary actuator 318 may be used to rotate the vacuum plate (and the liner panel 20 secured thereto) from a generally horizontal orientation (e.g. as shown in FIG. 15) to a generally vertical orientation (e.g. as shown in FIG. 16).

In the position shown in FIG. 16, the liner panel 20 has been brought into engagement with a folding assembly of third station 300. The folding assembly, referred to generally as 360, includes a frame 365 and first and second folding projections 364, 366 extending outwardly from frame 365.

By rotating, advancing, or concurrently rotating and advancing vacuum plate 315 to a position where a central segment 22 of an engaged second liner panel 20 has passed between rounded projections 364, 366 of folding assembly 360, the side segments 21, 23 of the engaged liner panel 20 portions may be brought into abutment with the projections 364, 366. As a result, segments 21, 23 may be folded inwardly towards the central segment 22, e.g., as shown in FIG. 16.

For example, folding assembly 360 can be configured to fold segments 21, 23 to provide at least a straight angle and, in some embodiments, an acute(<90°) angle between end segment 21 and central segment 22, and between end segment 23 and central segment 22. Folding segments 21, 23 to provide less than right angles between the end and central segments may facilitate the insertion of the liner panel 20 within box 30. For example, in such a folded configuration a width of central segment 22 may be the maximum overall width of the folded panel 20.

Notably, engagement mechanism 310 and folding assembly 360 cooperate to provide 90° indexing and concurrent folding of a liner panel 20 along two fold lines (e.g. a fold line between segment 21 and 22, and a fold line between segment 22 and 23, prior to inserting the liner panel 20 into the box 30.

Optionally a mechanical brake may be provided for rotary actuator 318, in order to hold (or assist in holding) the rotated assembly in place during insertion of a second liner panel 20 into a box 30, which may reduce the effort on the pneumatic rotary actuator 318 responsible for the 90° indexing (i.e. moving the second liner panel from a horizontal orientation to a vertical orientation).

In the illustrated apparatus 1000, liner panels 10, 20 are held by the engagement mechanisms 210, 310, respectively, using pneumatic suction. It will be appreciated that the vacuum plates 215, 315 and/or their respective suction systems can be adjustable to accommodate different liner panels. Furthermore, it will be appreciated that other panel prehension tools may be used instead of the vacuum plates 215, 315 including, and without being limitative, grippers, clamps, and the like.

Figure 18:
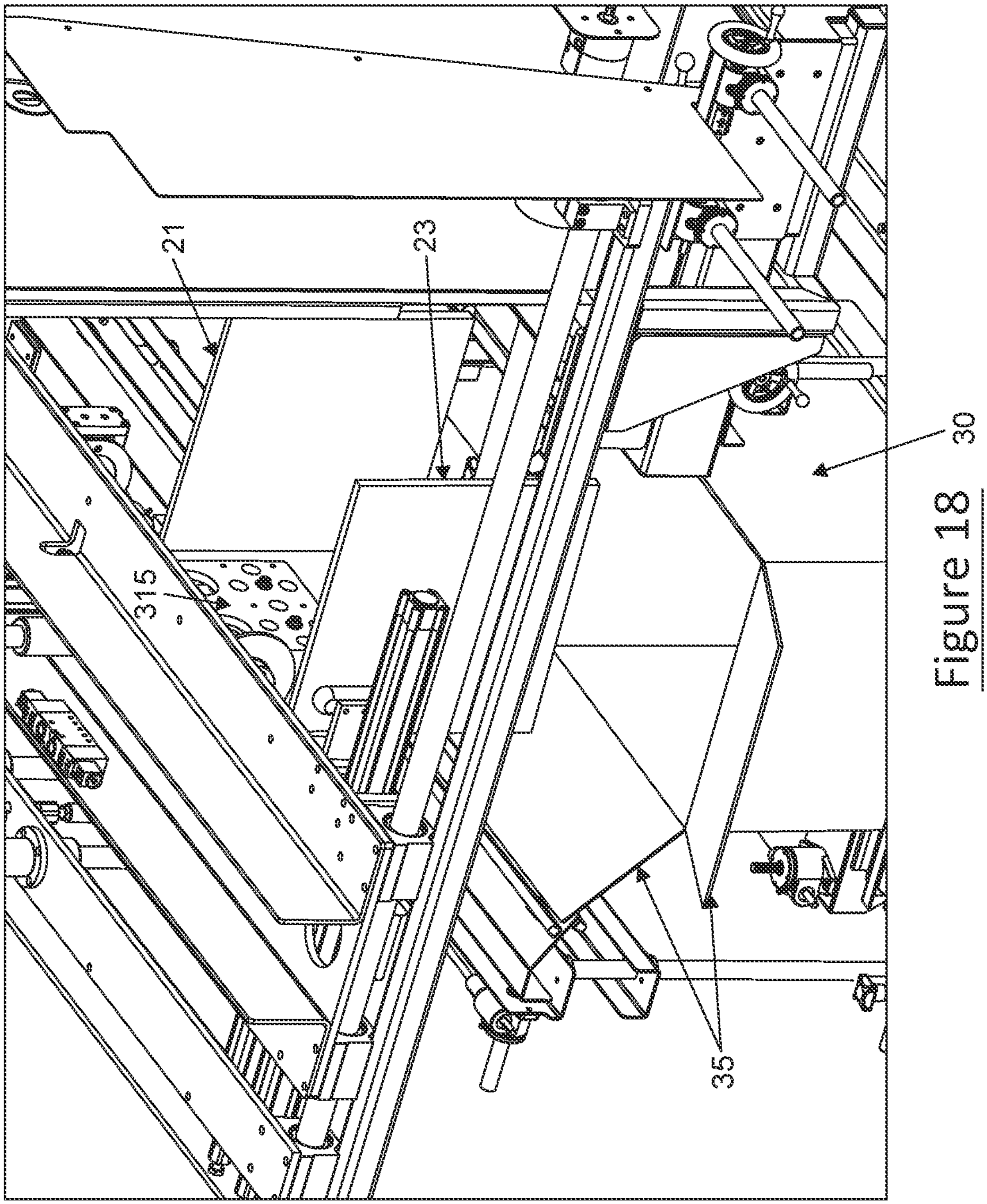
FIG. 18 is another perspective view of the third station of the apparatus of FIG. 3, with the rotated and folded second liner panel positioned above an upper end of the box in which a first liner panel has been installed.
Figure 19:
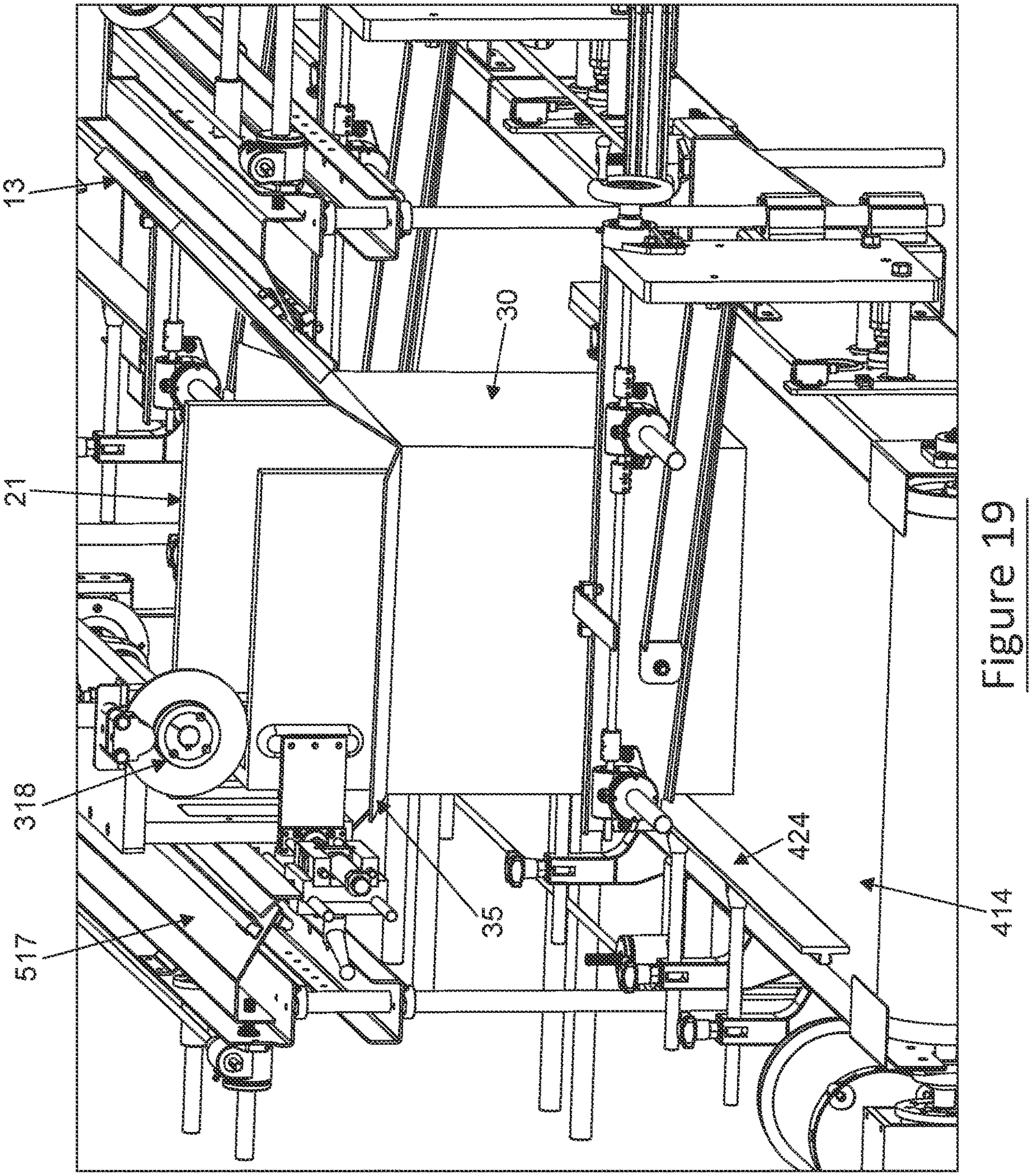
FIG. 19 is another perspective view of the third station of the apparatus of FIG. 3, with the rotated and folded second liner panel positioned partially within the box.

With reference to FIGS. 18 and 19, following (or concurrent with) the rotation and/or folding of liner panel 20, engagement mechanism 310 is also configured to lower a folded liner panel 20 towards the conveyor 410, such that at least a portion of the folded second liner layer 20 is positioned inside a box 30, e.g. as illustrated in FIG. 19.

Figure 20:
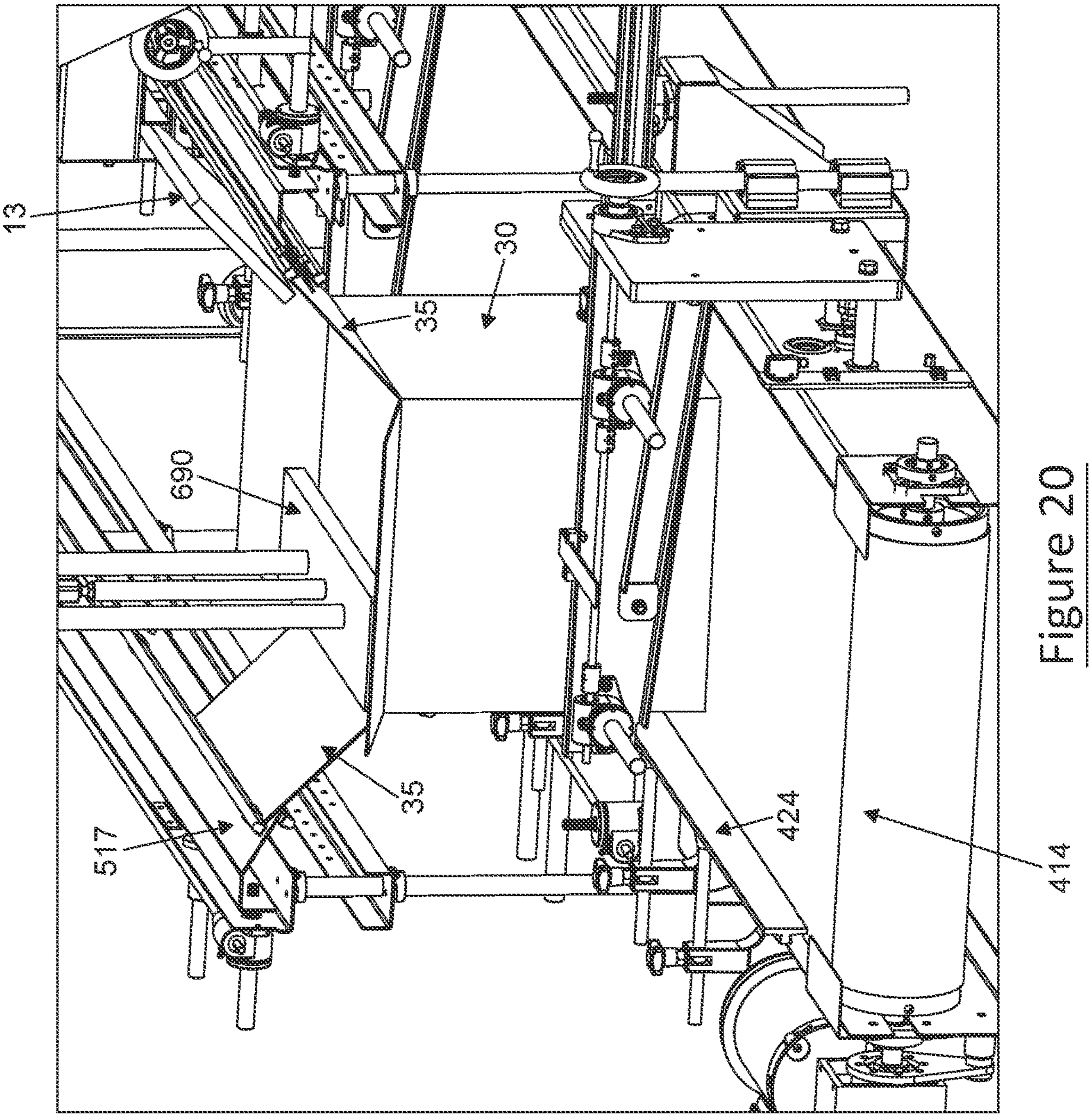
FIG. 20 is another perspective view of the third station of the apparatus of FIG. 3, with a pressing assembly urging the second liner panel into the box.

Turning to FIG. 20, once the folded liner panel 20 has been at least partially positioned within box 30, a packing ram 690 may be lowered towards the conveyor 410. Packing ram 690 is configured to abut an edge of at least the central segment 22, and can also abut at least the portion of the edges of segments 21, 23, in order to urge the liner panel 20 to a fully inserted position within box 30. For example, packing ram 690 may be configured to depress liner panel 20 until a lower edge of the panel 20 abuts the interior surface of the closed bottom end of the box 30 or a first segment 11 of the first liner panel 10 that was positioned adjacent the closed bottom end of the box 30 at the second station 200.

Figure 21:
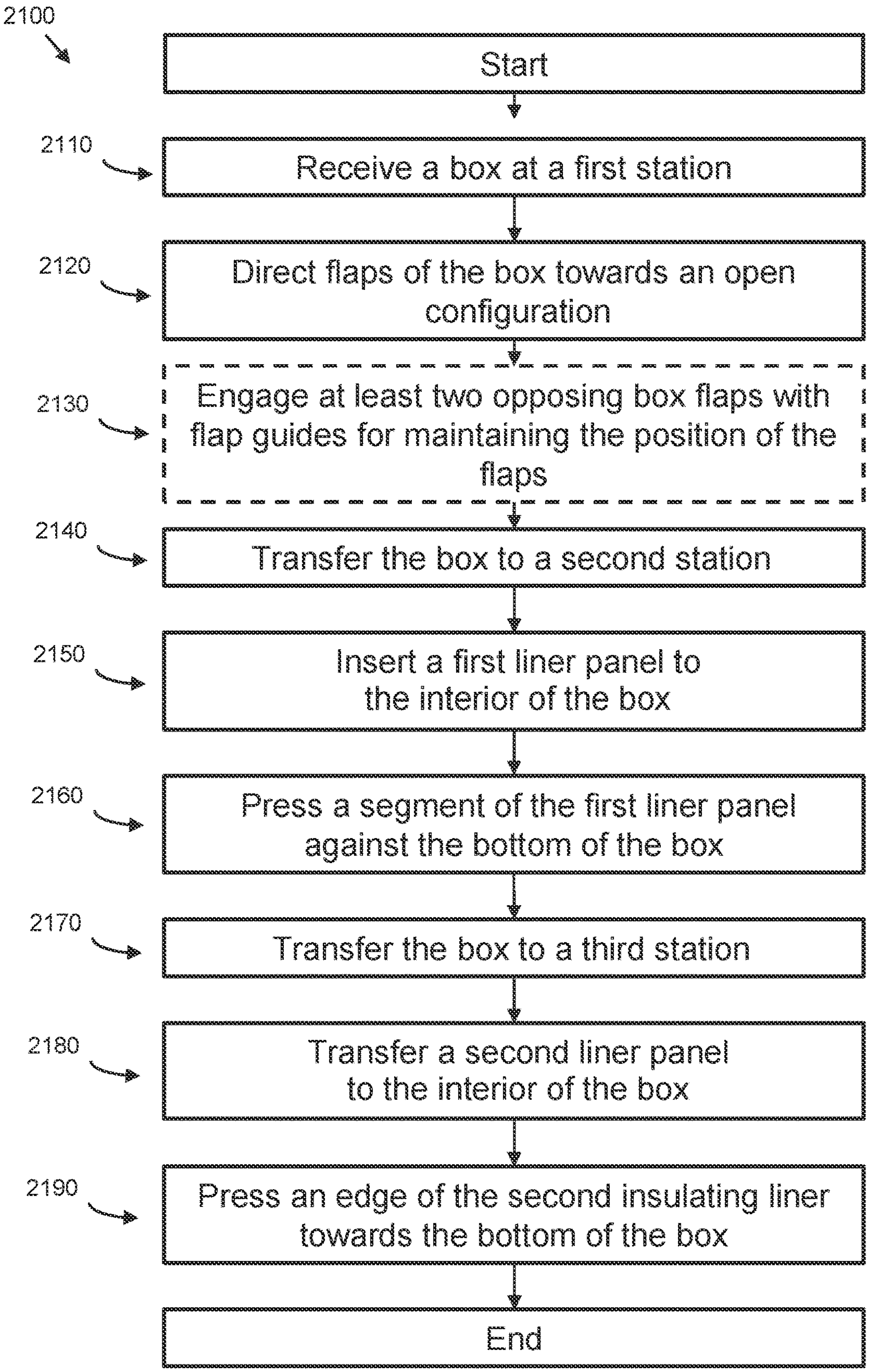
FIG. 21 is a flow diagram for an example method for assembling a thermally insulated container.

Referring to FIG. 21, there is illustrated a method 2100 for inserting insulating liner panels into a rectangular box to form a thermally insulated container. In a non-limitative embodiment, the box is a paperboard box.

Method 2100 may be performed using apparatus 1000, or other suitable apparatus.

At 2110, a box, such as a paperboard box, is received at a first station 100 of the apparatus 1000. For example, a box 30 with flaps 35 may be manually or automatically conveyed to a first station 100 of apparatus 1000, e.g., via an entry port 105. Optionally, conveyor belt 410 may be used to transfer/advance the box 30 to the first station 100.

At 2120, the flaps 35 of an open end of the box 30 are directed or urged to an open position (or configuration). For example, a flap opening wedge 125 having angled panels 124 may be lowered towards the open end of the box 30, such that the angled panels 124 engage flaps 35 of box 30 and divert the flaps outwardly as the flap opening wedge 125 is lowered.

Optionally, at 2130, the opened flaps of a box may be engaged with one or more flap guides to maintain the flaps in an opened configuration. For example, at least an outer portion of an opened flap 35 may deflect and pass under a resilient panel 515, wherein panel 515 may act to retain the flap 35 in an open configuration.

In one or more embodiments, the box 30 can be flap free, and steps 2120 and 2130 may be omitted.

At 2140, the opened box is transferred/advanced to a second station of the apparatus 1000. For example, conveyor belt 410 may be used to advance an opened box 30 to the second station 200. Optionally, one or more guides (e.g., box guide rails 422 and 424) may be used to maintain lateral alignment of box 30 as it is advanced by conveyor belt 410.

At 2150, a first thermal liner panel 10 is inserted within the opened box 30. For example, a liner engagement mechanism 210 may be used to engage an end segment 11 of the first liner panel 10 and transfer the end segment 11 to the interior of the box 30.

Optionally, individual first liner panels may be drawn from the bottom of a stack of first liner panels, e.g., using a magazine assembly 600.

At 2160, to position the first liner panel 10 in a predetermined configuration inside the box 30, a segment of the first liner panel can be pressed against a closed end of the opened box 30. For example, a liner engagement mechanism 210 may be used to lower the end segment 11 of a first liner panel 10 into abutment with the bottom of box 30's interior.

At 2170, the opened box 30 with the first liner panel 10 is transferred/advanced to a third station 300 of the apparatus 1000. For example, conveyor belt 410 may be used to advance the opened box 30 in which the first liner panel 10 has been inserted to the third station 300. Optionally, one or more guides (e.g., box guide rails 422 and 424) may be used to maintain lateral alignment of box 30 as it is advanced by conveyor belt 410.

At 2180, a second thermal liner panel is positioned within the opened box after being folded. For example, liner engagement mechanism 310 may be used to engage a central segment 22 of the second liner panel 20 and rotate the second liner panel 20 from a horizontal orientation to a vertical orientation. A folding assembly, such as folding assembly 360 may be used to fold outer segments 21, 23 inwardly towards central segment 22. Liner engagement mechanism 310 may then transfer the second liner panel 20 towards a configuration where at least a portion of each of the segments 21, 22, and 23 are positioned within the interior of the box 30.

Optionally, individual second liner panels 20 may be drawn from the bottom of a stack of second liner panels, e.g., using a magazine assembly 700.

At 2190, the second liner panel 20 is pressed towards the closed end of the opened box 30. For example, packing ram 690 may be used to depress liner panel 20 until a lower edge of the panel 20 abuts either the interior surface of the closed bottom end of the box 30 or a first segment 11 of the first liner panel 10 that was positioned adjacent the closed bottom end of the box 30 at the second station 200.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. Apparatus for inserting a first insulating liner panel and a second insulating liner panel into a rectangular box to form a thermally insulated container, the box having a closed end, four sidewalls, an interior volume, and at least two lid flaps, the apparatus comprising:

a first station comprising a flap opening assembly for directing the at least two of the lid flaps of the box to an open configuration;

a second station comprising a first liner panel insertion assembly for inserting the first liner panel within the box, wherein in an inserted configuration a first segment of the first liner panel is positioned adjacent the closed end of the box, and a second segment of the first liner panel is positioned adjacent a first of the four sidewalls of the box;

a third station comprising a second liner panel insertion assembly for inserting the second liner panel within the box, wherein in an inserted configuration a first segment of the second liner panel is positioned adjacent a second of the four sidewalls of the box, a second segment of the second liner panel is positioned adjacent a third of the four sidewalls of the box, and a third segment of the second liner panel is positioned adjacent a fourth of the four sidewalls of the box;

a box transfer system configured to transfer the box between the first station, the second station, and the third station; and a flap guide system for maintaining the at least two of the lid flaps of the box in the open configuration as the box is transferred from the first station to the third station.

2. The apparatus of claim 1, wherein the second station further comprises a first liner panel magazine assembly configured to receive a stack of first liner panels and to selectively provide a lowest one of the first liner panels from the stack of first liner panels to the second station.

3. The apparatus of claim 2, wherein the first liner panel magazine assembly comprises:

a platform for supporting the stack of first liner panels;

first and second magazine sidewalls separated by a sidewall distance to define a liner panel loading chamber therebetween, each one of the first and second magazine sidewalls having at least one roller-receiving slot defined therethrough;

at least one first roller mounted to a first drive shaft positioned outside the first magazine sidewall and having a portion thereof aligned with a respective one of the at least one roller-receiving slot;

at least one second roller mounted to a second drive shaft positioned outside the second magazine sidewall and having a portion thereof aligned with a respective one of the at least one roller-receiving slot; and at least one actuator configured to rotate the first and second drive shafts in opposite directions;

wherein as the first and second drive shafts are rotated:

a perimeter of each of the at least one first roller and the at least one second roller cyclically projects inwardly through the respective one of the at least one roller-receiving slot and into the liner panel loading chamber to frictionally engage, respectively, a first side edge and a second side edge of at least one first liner panel in the stack of first liner panels and urge the engaged at least one first liner panel upwardly.

4. The apparatus of claim 3, wherein the first and second drive shafts are eccentric, and the at least one first roller and the at least one second roller are each generally circular.

5. The apparatus of claim 3, wherein the at least one first roller and the at least one second roller are eccentric.

6. The apparatus of claim 3, wherein the perimeter of the at least one first roller and the perimeter of the at least one second roller each comprise a rubberized outer surface.

7. The apparatus of claim 3, wherein the second station comprises a panel engagement mechanism configured to selectively engage an end segment of the lowest first liner panel in the stack of first liner panels.

8. The apparatus of claim 3, wherein the first liner panel magazine assembly further comprises:

an advancement mechanism provided on an upper surface of the platform, the advancement mechanism comprising:

a raised projection configured to be selectively reciprocated between a retracted configuration, in which the raised projection is positioned distal from an outer end of the stack of first liner panels, and an advanced configuration in which the raised projection has moved towards the box located at the second station, wherein as the raised projection moves towards the advanced configuration, the raised projection is configured to abut an outer edge of the lowest first liner panel in the stack of first liner panels, thereby displacing the lowest first liner panel towards the box.

9. The apparatus of claim 8, wherein the at least one actuator configured to rotate the first and second drive shafts and the advancement mechanism are synchronized such that as the engaged at least one first liner panel us urged upwardly, the raised projection is moved towards the advanced configuration.

10. The apparatus of claim 1, wherein the third station further comprises a second liner panel magazine assembly configured to receive a stack of second liner panels and to selectively provide a lowest second liner panel from the stack of second liner panels to the third station.

11. The apparatus of claim 10, wherein the third station comprises a folding assembly configured to fold end segments of the second liner panel inwardly towards a central segment of the second liner panel prior to the insertion of the second liner panel within the box.

12. The apparatus of claim 11, wherein the folding assembly comprises a frame and first and second folding projections extending outwardly from the frame towards a pickup position for the second liner panel, the first and second folding projections being spaced horizontally from each other.

13. The apparatus of claim 12, wherein the third station comprises a panel engagement mechanism, the panel engagement mechanism comprising:

a vacuum plate configured to selectively engage the central segment of the second liner panel at the pickup position; and at least one motion actuator configured to convey the vacuum plate from the pickup position to a position proximate the frame of the folding assembly;

wherein as the panel engagement mechanism conveys the central segment of the second liner panel from the pickup position to the position proximate the frame of the panel folding assembly, the first folding projection directs a first end segment to fold towards the central segment to form an acute angle between the first end segment and the central segment, and the second folding projection directs a second end segment to fold towards the central segment to form an acute angle between the second end segment and the central segment.

14. The apparatus of claim 13, wherein the third station comprises a packing ram configured to be lowered towards the box, wherein, as the packing ram is lowered, the packing ram is configured to abut an edge of at least one of the first, second, and third segments of the second liner panel to urge the second liner panel to an inserted configuration within the box.

15. An assembly for inserting a liner panel into a box, the assembly comprising:

a panel engagement mechanism configured to selectively engage an end segment of the liner panel and convey the engaged liner panel from a pickup position to an insertion position where the engaged end segment overlies an open end of the box; and a guide positioned underneath the panel engagement mechanism and extending from a first end positioned proximate the pick-up position to a second end positioned proximate the open end of the box, wherein an upper surface of the guide is configured to support at least one non-engaged segment of the engaged liner panel as the engaged liner panel is conveyed from the pickup position to the insertion position;

wherein the first end of the guide is secured in a fixed position, and the second end is unsupported.

16. The assembly of claim 15, wherein the liner panel is a segmented liner panel with fold lines defined between adjacent segments, and wherein the guide is a curved-shape plate.

17. An assembly for conveying and folding a segmented liner panel for insertion into a box, the liner panel having fold lines defining a first end segment, a central segment, and a second end segment, the assembly comprising:

a panel engagement mechanism comprising a panel prehension tool configured to selectively engage the central segment of the liner panel at a pickup position and at least one motion actuator configured to displace the panel prehension tool; and a panel folding mechanism comprising a frame and first and second folding projections extending outwardly from the frame towards the pickup position, the first and second folding projections being spaced horizontally from each other;

wherein as the panel engagement mechanism conveys the central segment of the liner panel from the pickup position to a position proximate the frame of the panel folding mechanism and between the first and second folding projections, the first and the second folding projections, respectively, direct the first and the second end segments to fold towards the central segment.

18. The assembly of claim 17, wherein the panel prehension tool comprises a vacuum plate and the panel engagement mechanism further comprises a rotary actuator configured to rotate the vacuum plate from a horizontal orientation to a vertical orientation.

19. The assembly of claim 17, wherein the first and second folding projections define an acute angle with the frame to form an acute angle between the first end segment and the central segment.

20. A method for inserting a first insulating liner panel and a second insulating liner panel into a rectangular box to form a thermally insulated container using the apparatus of claim 1, the box having a closed end, four sidewalls, an interior volume, and at least two lid flaps, the method comprising:

providing the box to the first station of the apparatus;

at the first station, directing the at least two of the lid flaps of the box to an open configuration;

transferring the box to the second station of the apparatus;

at the second station, inserting the first liner panel within the box, wherein in an inserted configuration a first segment of the first liner panel is positioned adjacent the closed end of the box, and a second segment of the first liner panel is positioned adjacent a first of the four sidewalls of the box;

transferring the box to the third station of the apparatus; and at the third station, inserting the second liner panel within the box, wherein in an inserted configuration a first segment of the second liner panel is positioned adjacent a second of the four sidewalls of the box, a second segment of the second liner panel is positioned adjacent a third of the four sidewalls of the box, and a third segment of the second liner panel is positioned adjacent a fourth of the four sidewalls of the box.

* * * * *